US012781676B2

(12) United States Patent
Abrosimov et al.

(10) Patent No.: US 12,781,676 B2
(45) **Date of Patent: *Nov. 3, 2026**

(54) VEHICLE CONTROL SYSTEM

(71) Applicant: Transportation IP Holdings, LLC, Norwalk, CT (US)

(72) Inventors: Igor Abrosimov, Germantown, MD (US); Osman Burak Onal, Germantown, MD (US); Brian Kurz, Germantown, MD (US); Harry Kirk Mathews, Jr., Clifton Park, NY (US); Sarah Felix, Niskayuna, NY (US); Gayathri Indra Seenumani, Niskayuna, NY (US); Kalpesh Singal, Ballston Spa, NY (US); Etika Agarwal, Bangalore (IN); Dibyajyoti Pati, Bangalore (IN); Ashish Anil Paralikar, Bangalore (IN); Sachin Shivajirao Kulkarni, Bangalore (IN); Darren Collins Gladney, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/613,803

(22) Filed: Mar. 22, 2024

(65) Prior Publication Data

US 2024/0229732 A1 Jul. 11, 2024

Related U.S. Application Data

(60) Continuation-in-part of application No. 18/344,448, filed on Jun. 29, 2023, and a continuation-in-part of
(Continued)

(51) Int. Cl.
*F02D 41/02* (2006.01)
*F02D 41/14* (2006.01)
(Continued)

(52) U.S. Cl.
CPC ....... *F02D 41/021* (2013.01); *F02D 41/1406* (2013.01); *G01C 21/3469* (2013.01);
(Continued)

(58) Field of Classification Search
CPC .. G05D 1/0293; G05D 1/0212; B60T 8/1705; B60T 8/1701; G01C 21/3407; G08G 1/20
See application file for complete search history.

(56) References Cited

U.S. PATENT DOCUMENTS 11,318,970 B2 * 5/2022 Angel .................... B61L 25/025
2011/0118913 A1 * 5/2011 Pretorius .................... B61L 5/06
701/19
(Continued)

*Primary Examiner* — Hussein Elchanti
(74) *Attorney, Agent, or Firm* — K&L Gates LLP

(57) ABSTRACT

A vehicle control system and method receive vehicle makeup information from multiple vehicles in a multi-vehicle system. The vehicle makeup information represents one or more characteristics of the vehicles. The vehicle makeup information is received at a controlling vehicle of the vehicles in the multi-vehicle system that controls movement of the multi-vehicle system. The controlling vehicle also receives locations from location-determining devices respectively onboard the vehicles in the multi-vehicle system. The controlling vehicle controls operation of the multi-vehicle system using a combination of the vehicle makeup information received from the vehicles and the locations of the vehicles.

18 Claims, 18 Drawing Sheets

Related U.S. Application Data application No. 18/344,029, filed on Jun. 29, 2023, now abandoned, and a continuation-in-part of application No. 17/223,884, filed on Apr. 6, 2021, now Pat. No. 12,007,787, said application No. 18/344,448 is a continuation-in-part of application No. 17/007,473, filed on Aug. 31, 2020, now abandoned, which is a division of application No. 15/918,002, filed on Mar. 12, 2018, now Pat. No. 10,781,763.

(60) Provisional application No. 63/391,835, filed on Jul. 25, 2022, provisional application No. 63/009,194, filed on Apr. 13, 2020, provisional application No. 62/491,234, filed on Apr. 27, 2017.

(51) Int. Cl.

*G01C 21/34* (2006.01)
*G05D 1/00* (2024.01)

(52) U.S. Cl.

CPC ......... *G05D 1/0005* (2013.01); *G05D 1/0088* (2013.01); *G05D 1/0217* (2013.01); *G05D 1/0223* (2013.01); *G05D 1/0276* (2013.01); *G05D 1/0293* (2013.01); *F02D 2041/1412* (2013.01); *F02D 2200/0414* (2013.01); *F02D 2200/0418* (2013.01); *F02D 2200/1002* (2013.01); *F02D 2200/701* (2013.01); *F02D 2200/703* (2013.01); *F02D 2250/18* (2013.01)

(56) References Cited

U.S. PATENT DOCUMENTS

2011/0270475 A1* 11/2011 Brand ................. B61L 15/0027 701/19
2012/0277939 A1* 11/2012 Kumar ................ B61L 15/0072 701/19
2020/0139945 A1* 5/2020 Schoenly ................ B61C 17/12
2021/0318694 A1* 10/2021 Abrosimov ............. B61L 27/40
2022/0024503 A1* 1/2022 Vrba ..................... B61L 23/041

* cited by examiner

502

504

| | | Barometric Pressure | | |
|---|---|---|---|---|
| | | **X** | **Y** | **Z** |
| Temperature | **A** | (1) | (2) | (3) |
| | **B** | (4) | (5) | (6) |
| | **C** | (7) | (8) | (9) |

506

508

FIG. 17

VEHICLE CONTROL SYSTEM

CROSS-REFERENCE TO RELATED APPLICATIONS

This application is a continuation-in-part of U.S. patent application Ser. No. 17/223,884 (filed 6 Apr. 2021), which claims priority to U.S. Provisional Application No. 63/009,194 (filed 13 Apr. 2020). This application also is a continuation-in-part of U.S. patent application Ser. No. 18/344,029 (filed 29 Jun. 2023), which claims priority to U.S. Provisional Application No. 63/391,835 (filed 25 Jul. 2022). This application also is a continuation-in-part of U.S. patent application Ser. No. 18/344,448 (filed 29 Jun. 2023), which is a continuation-in-part of U.S. patent application Ser. No. 17/007,473 (filed 31 Aug. 2020), which is a divisional of U.S. patent application Ser. No. 15/918,002 (filed 12 Mar. 2018, now U.S. Pat. No. 10,781,763), which claims priority to U.S. Provisional Application No. 62/491,234 (filed 27 Apr. 2017). The entire disclosures of all these applications are incorporated herein by reference.

BACKGROUND

Technical Field

The subject matter described herein relates to systems and methods that monitor and control vehicles in a multi-vehicle system.

Discussion of Art

Some vehicle systems are formed from multiple vehicles that move together along routes. For example, rail vehicle systems (e.g., trains) may be formed from one or more locomotives and one or more rail cars. A locomotive can control operation of brakes onboard the other locomotives and rail cars, and may control throttle operation of the other locomotives (if any). The vehicle that controls the operation of other vehicles in the vehicle system (e.g., the lead vehicle) may need to know the location and/or sequence of the other vehicles in order to accurately and safely control operation of the other vehicles.

But, the location and/or sequence of the other vehicles in the vehicle system may be manually provided to the lead vehicle and/or may be based on a manifest. Either of these sources of information can be prone to error. This can cause the lead vehicle to not have the correct locations and/or sequence of the vehicles in the vehicle system. Consequently, the lead vehicle may not be able to safely and accurately control operation of the vehicle system.

Some known vehicle systems vehicle groups include one or more engines that consume fuel and air (e.g., oxygen) to generate propulsive force and travel along routes during trips. When planning how a vehicle system will travel during an upcoming scheduled trip, there is a general assumption that the one or more engines of the vehicle system will be able to provide uniform power delivery throughout the duration of the trip, at least through open areas outside of tunnels and other airflow-restricted areas. For example, it is generally assumed that the vehicle system will have sufficient oxygen supply and ventilation as the vehicle system travels through open areas to enable the engines to consistently provide power outputs corresponding to the horsepower ratings of the engines.

This general assumption is often not true, however, as engines may experience deration during a trip. The engine is not capable of providing a power output at the horsepower rating of the engine when an engine experiences deration. The varying engine capability may be caused by various environmental and internal changes experienced by the engine during the trip, such as changes in elevation (or altitude), air quality, oxygen concentration in the air, ambient temperature, ambient pressure, ambient humidity, fuel quality, and/or engine conditions. Since the movement of the vehicle system during a trip may be planned in advance, such plans may assume uniform engine performance without accounting for the variations in engine performance experienced at different times and locations during the trip. As a result, the movement planning may not accurately match the capabilities of the vehicle system, which can lead to increasing discrepancies between the movement plan and the actual performance of the vehicle system during a trip. If the vehicle system was being controlled automatically based on the movement plant, an operator may have to take manual control of the vehicle system due to the discrepancy between the planned movement and the actual movement caused by unaccounted engine deration.

Some known vehicle systems can include several propulsion-generating vehicles that are coupled with each other to push and/or pull other vehicles (e.g., non-propulsion-generating vehicles). For example, some rail vehicle systems include several locomotives and rail cars or passenger cars interconnected with each other. Different control schemes can be used to coordinate movements of the propulsion-generating vehicles with each other to ensure that the propulsion and/or braking efforts generated by the different vehicles safely move the vehicle system along a route.

As one example, distributed power (DP) control can be used to control multiple locomotives that are not adjacent to each other. For example, the locomotives can be distributed throughout the length of a vehicle system and are not adjacent to each other. A lead locomotive can send signals to the other locomotives to direct throttle and/or brake settings of the other locomotives.

One problem with DP control is the ability to make real time adjustments to power contributions by different vehicles while the multi-vehicle system is moving. For example, before the vehicle system embarks on a trip, the vehicle system may generate and/or receive power control commands indicating operational control settings for the locomotives at different times, distances, or locations as the multi-vehicle system moves along the route on the trip. However, the vehicle system may come across unexpected route conditions, route conditions that differ from what were anticipated, or the like. A need exists for a system and method that allows for real time adjustments to the distributed power control of the different locomotives of a vehicle system that addresses the shortcomings of currently known systems and methods.

BRIEF DESCRIPTION

In one embodiment, a method includes receiving vehicle makeup information from multiple vehicles in a multi-vehicle system. The vehicle makeup information represents one or more characteristics of the vehicles. The vehicle makeup information received at a controlling vehicle of the vehicles in the multi-vehicle system that controls movement of the multi-vehicle system. The method also includes receiving, at the controlling vehicle, locations from location-determining devices respectively onboard the vehicles in the multi-vehicle system, and controlling, with the controlling vehicle, operation of the multi-vehicle system using a combination of the vehicle makeup information received from the vehicles and the locations of the vehicles.

In one embodiment, a control system includes a controller configured to be disposed onboard a controlling vehicle of a multi-vehicle system. The controller is configured to receive vehicle makeup information from multiple other vehicles in the multi-vehicle system. The vehicle makeup information representing one or more characteristics of the other vehicles. The controller also is configured to receive locations from location-determining devices respectively onboard the other vehicles in the multi-vehicle system and to control operation of the multi-vehicle system using a combination of the vehicle makeup information received from the other vehicles and the locations of the other vehicles.

In one embodiment, a method includes receiving different location signals from different non-propulsion vehicles of a multi-vehicle system at a propulsion vehicle of the multi-vehicle system. The location signals indicate different locations of the non-propulsion vehicles. The method also includes determining a sequence of the non-propulsion vehicles in the multi-vehicle system based on the locations that are received, and controlling brakes onboard the non-propulsion vehicles based on the sequence of the non-propulsion vehicles.

In accordance with one aspect or example, a method may include controlling operation of a vehicle system according to a first set of operating conditions while the vehicle system is moving along a route. The vehicle system may include plural vehicles that may move together along the route. Two or more vehicles of the vehicle system may each contribute a predetermined amount of effort to propel the vehicle system to move along the route based on the first set of operating conditions. The effort may be tractive effort and/or braking effort. Responsive to determining a revised amount of effort that at least one of the two or more vehicles of the vehicle system needs to contribute to propel the vehicle system to control one or more performance variables of the vehicle system, control of the vehicle system may be changed from being controlled according to the first set of operating conditions to automatically controlling operation of the vehicle system according to a second set of operating conditions. The at least one vehicle may contribute the revised amount of effort while the vehicle system operates according to the second set of operating conditions.

In accordance with one aspect or example, a control system may include one or more processors that control operation of a vehicle system according to a first set of operating conditions while the vehicle system is moving along a route. Two or more vehicles of the vehicle system may each contribute a predetermined amount of effort to control movement of the vehicle system to move along the route based on the first set of operating conditions. The effort may be tractive effort and/or braking effort. The processors may determine a revised amount of effort that each of the two or more vehicles of the vehicle system needs to contribute to propel the vehicle system and to control one or more performance variables of the plural vehicles. Responsive to a determination of a revised amount of effort that at least one of the two or more vehicles of the vehicle system needs to contribute to propel the vehicle system to control one or more performance variables of the plural vehicles, the one or more processors may change from controlling the vehicle system according to the first set of operating conditions to automatically controlling operation of the vehicle system according to a second set of operating conditions. At least one of the two or more vehicles may contribute the revised amount of effort while the vehicle system operates according to the second set of operating conditions.

In accordance with one aspect or example, a method may include one or more of generating or receiving a first set of operating conditions for controlling operation of a vehicle system according to the first set of operating conditions before the vehicle system starts moving along a route. The vehicle system may include plural vehicles. The first set of operating conditions specifying a predetermined amount of effort that each of two or more vehicles of the vehicle system is to contribute to propel the vehicle system to move along the route. A revised amount of effort that one or more vehicles of the vehicle system needs to contribute to propel the vehicle system may be determined to control one or more performance variables of the plural vehicles while the vehicle system is moving along the route. Control of the vehicle system may change from controlling the vehicle system according to the first set of operating conditions to automatically controlling operation of the vehicle system according to a second set of operating conditions.

A vehicle control system as described herein can include one or more processors that can identify one or more geographic areas through which a vehicle group is scheduled to travel for an upcoming trip. This area or these areas may be identified as area(s) where there is an increased likelihood of a need for derating one or more engines of the vehicle group. The processor(s) can create or modify a trip plan that dictates one or more operational settings of the vehicle group for one or more of different locations, distances, or times of the upcoming trip. The processor(s) may create or modify the trip plan to avoid a decrease in total power output from the vehicle group within the geographic area(s).

A method for controlling operation of a vehicle group may include identifying one or more geographic areas through which a vehicle group is scheduled to travel for an upcoming trip where there is an increased likelihood of a need for derating one or more engines of the vehicle group. The method can include creating or modifying a trip plan that dictates one or more operational settings of the vehicle group for one or more of different locations, distances, or times of the upcoming trip. The trip plan is created or modified to avoid a decrease in total power output from the vehicle group within the one or more geographic areas. The method also includes controlling operation of the vehicle group to move through the geographic area(s) according to the operational setting(s) of the trip plan that is created or modified. This can include, for example, changing speeds, throttle settings, brake effort, brake settings, and/or power sources for powering motor(s).

Another example of a vehicle control system can include one or more processors that may identify a geographic area in which an ambient condition requires deration of a first engine in a multi-vehicle system to avoid damaging the engine. The one or more processors can control one or more of (a) a second engine in the multi-vehicle system to supplant a reduction in power output by the first engine during travel through the geographic area or (b) an onboard energy storage device to power a motor and supplant the reduction in power output by the first engine during travel through the geographic area.

BRIEF DESCRIPTION OF THE DRAWINGS

The inventive subject matter may be understood from reading the following description of non-limiting embodiments, with reference to the attached drawings, wherein below:

FIG. 17 is a table illustrating an engine performance map for an engine of the propulsion system of the vehicle system;

DETAILED DESCRIPTION

Figure 1:
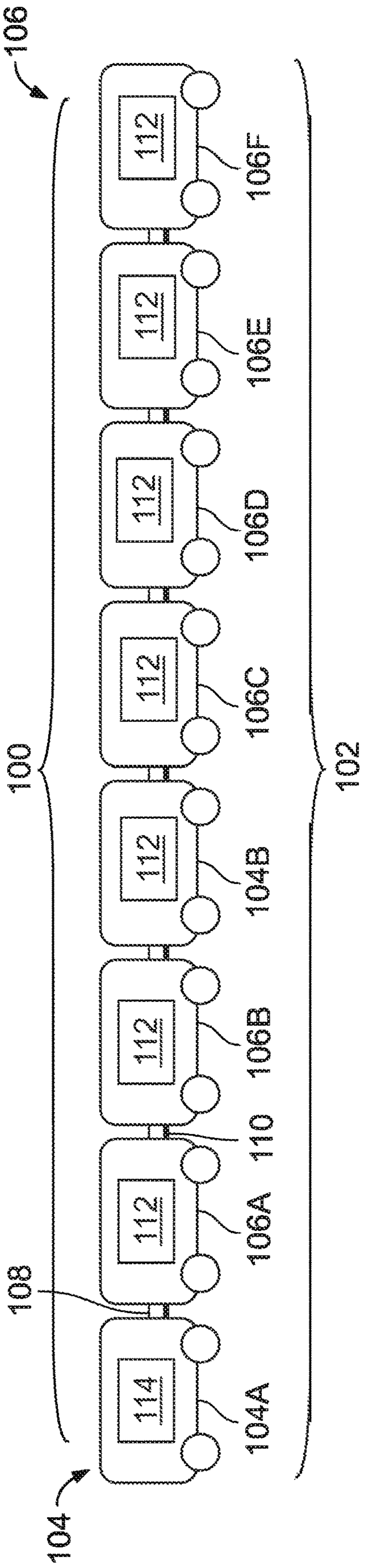
FIG. 1 illustrates one example of a vehicle control system.

One or more embodiments of the inventive subject matter described herein provide control systems and methods that monitor locations of vehicles in a multi-vehicle system and control operation of these vehicles based on the locations that are monitored. The vehicles may include location determining devices that report the locations of the vehicles to a lead vehicle in the same vehicle system. The lead vehicle receives this information and can control the vehicle system in a variety of ways based on this information, as described herein. For example, each vehicle can be equipped with a global positioning system (GPS) receiver and can send GPS data to a head end unit (e.g., the lead vehicle) along with other vehicle status information, such as whether the vehicle is empty or carrying cargo, whether a brake (e.g., a hand brake) is engaged, etc. The location of each vehicle can be used for multiple purposes, such as vehicle sequencing (e.g., determining the sequence or order of vehicles in the vehicle system), updating or monitoring a vehicle database, travel optimization activities, mitigation of communication crosstalk, etc.

In operation, the head end unit can initiate sequencing by sending a broadcast message to other vehicles. This message can direct or request that the vehicles report the presence of the vehicles. The vehicles can respond to the message from the head end unit with a message that includes the location of the respective vehicle, and optionally other status information, identifying information, etc. The locations can be reported as absolute locations (e.g., locations relative to a fixed reference point, such as geographic coordinates) and/or relative locations (e.g., locations relative to a moving reference point, such as a distance from the head end unit, a distance from another vehicle, etc.). The head end unit can then enumerate the vehicles based on the reported locations and route geographic properties (the layout or location of a route obtained from a route database) corresponding to the route segment identified or disposed below the vehicle locations.

This technique is more expedient and can be used as a reliable primary method in some locations and/or as secondary method to partially validate traditional sequencing (e.g., when some vehicles have difficulty connecting to an external communication device, such as a satellite). The locations of the vehicles can be an additional filtering criteria for crosstalk mitigation. The vehicles can use the locations reported by the vehicles to determine whether other signals or information is sent from a vehicle in the same vehicle system or a nearby vehicle that is not in the same vehicle system as the receiver of the signals or information. For example, responses from a broadcast message can receive responses from many vehicles due to the wireless communication range of the vehicle that sends the broadcast message. The head end unit (or other vehicle) that sent the broadcast message can filter or disregard those responses that are received from vehicles that report locations that do not correspond to the same vehicle system or route segment that the head end unit is located in.

While one or more embodiments of the inventive subject matter are described as relating to rail vehicles and rail vehicle systems (e.g., trains, locomotives, rail cars, etc.), not all embodiments of the inventive subject matter are limited to rail vehicles. One or more embodiments of the inventive subject matter relate to other vehicle systems, such as vehicle systems formed entirely or partially from automobiles, transit vehicles, agricultural vehicles, mining vehicles, marine vessels, or the like.

FIG. 1 illustrates one example of a vehicle control system 100. The vehicle control system may be disposed onboard a multi-vehicle system 102 formed from plural vehicles 104, 106. The vehicles in the vehicle system are mechanically and/or fluidly coupled with each other in the illustrated embodiment. For example, the vehicles in the vehicle system may be mechanically coupled by couplers 108 and fluidly coupled with each other by a brake pipe 110 of an air brake system onboard the vehicle system. Alternatively, two or more of the vehicles in the vehicle system may not be coupled with each other. For example, the vehicles may not be mechanically or fluidly coupled with each other, but may be communicatively and/or logically coupled with each other so that the vehicles can communicate with each other as the vehicles move. This allows the vehicles to coordinate movements with each other and move along routes together as a vehicle system (e.g., as a convoy).

The vehicles 104 (e.g., vehicles 104A, 104B) can be propulsion-generating vehicles that operate to move the vehicle system along routes (e.g., tracks, roads, paths, etc.). For example, the propulsion-generating vehicles can be locomotives, automobiles, trucks, tractors, boats, or the like. The vehicles 106 (e.g., vehicles 106A-F) can be non-propulsion-generating vehicles that are moved by the propulsion-generating vehicles. For example, the non-propulsion-generating vehicles can represent rail cars, trailers, barges, etc. The number and arrangement of the vehicles shown in FIG. 1 is provided as one example. The vehicle 104A may be referred to as a controlling vehicle, a lead vehicle, or a head end unit that communicates with the other vehicles to control operation of the vehicles. For example, the controlling vehicle can send (e.g., broadcast and/or transmit) control signals to the other propulsion-generating vehicle(s) to direct throttle settings and/or brake settings of the other propulsion-generating vehicle(s). As another example, the controlling vehicle can send control signals to the non-propulsion-generating vehicles to individually direct brake settings of the non-propulsion-generating vehicles. While the controlling vehicle or head end unit is disposed at the leading end (relative to a direction of travel) of the vehicle system shown in FIG. 1, the controlling vehicle may be disposed in another position in the vehicle system.

The control system includes location determining devices 112 disposed onboard the vehicles in the vehicle system. The location determining devices determine individual locations of the vehicles and that communicate the locations to the controlling vehicle. These locations can be absolute locations (e.g., geographic coordinates) and/or relative locations (e.g., distances from another vehicle in the vehicle system). The vehicles communicate the locations of the vehicles and may communicate vehicle makeup information to the controlling vehicle. The makeup information can include characteristics of the vehicles. These characteristics can include the status or the health of components onboard the vehicles, such as the state or health of a brake or brake control device onboard the vehicle, the presence of cargo onboard the vehicle, etc.

The control system includes a controller 114 onboard the controlling vehicle. The controller uses the makeup information and the locations reported by the vehicles using a combination of the makeup information and the locations of the vehicles. The controller can represent hardware circuitry that includes and/or is connected with one or more processors (e.g., one or more microprocessors, one or more field programmable gate arrays, one or more integrated circuits, or the like). As one example, the controller can determine the sequence of the vehicles in the vehicle system. The sequence can be the order in which the vehicles are positioned relative to each other in the vehicle system. In the example shown in FIG. 1, the controller can receive the locations from the other vehicles and determine that the vehicle 106A is second in the vehicle sequence of the vehicle system, the vehicle 106B is third in the vehicle sequence, the vehicle 104B is fourth in the vehicle sequence, and so on. The sequence of the vehicles can be used by the controller to control movement of the vehicle system.

For example, based on the order of the vehicles, the controller can direct some vehicles to engage the brake onboard the vehicles, direct other vehicles to engage the brakes at different levels or settings, direct other vehicles to generate propulsion or thrust, direct other vehicles to generate another amount of propulsion or thrust, etc. If the vehicle system is crossing a peak in the route, the controller can use the locations of the vehicles to determine which vehicles to direct to brake (e.g., the vehicles on the downhill grade or slope on one side of the peak) and which vehicles to direct to generate propulsion (e.g., the vehicles on the uphill grade or slope on the other side of the peak).

As another example, the controller can examine the locations of the vehicles and direct different vehicles to brake or generate propulsion to control slack in the couplers, change the distance between neighboring vehicles, or the like. Stated differently, responsive to the controller determining that neighboring vehicles or neighboring segments of several vehicles in the same vehicle system are farther apart than a threshold distance, the controller can determine that the coupler(s) between the vehicles or vehicle segments are stretched or in a stretched state. The controller can then direct the vehicles or the vehicles in the segment ahead of the stretched coupler(s) to reduce throttle settings, engage brakes, or otherwise slow down. The controller also may direct the vehicles or the vehicles in the segment behind the stretched coupler(s) to increase throttle settings, disengage brakes, or otherwise speed up. As another example, responsive to the controller determining that neighboring vehicles or neighboring segments of several vehicles in the same vehicle system are closer together than another threshold distance, the controller can determine that the coupler(s) between the vehicles or vehicle segments are compressed or in a compressed state. The controller can then direct the vehicles or the vehicles in the segment ahead of the compressed coupler(s) to increase throttle settings, disengage brakes, or otherwise speed up. The controller also may direct the vehicles or the vehicles in the segment ahead of the compressed coupler(s) to decrease throttle settings, engage brakes, or otherwise slow down.

Figure 2:
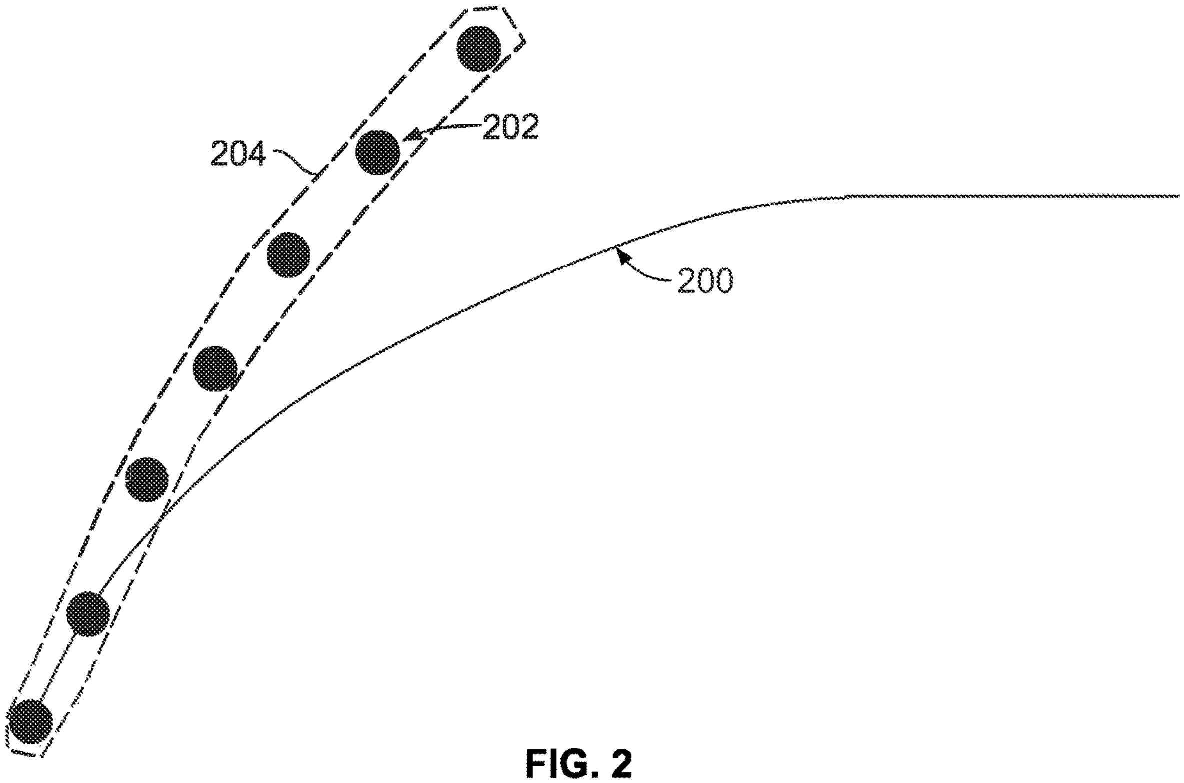
FIG. 2 illustrates an example of a stored layout of a route segment compared with reported locations of the vehicles in the vehicle system shown in FIG. 1.
Figure 3:
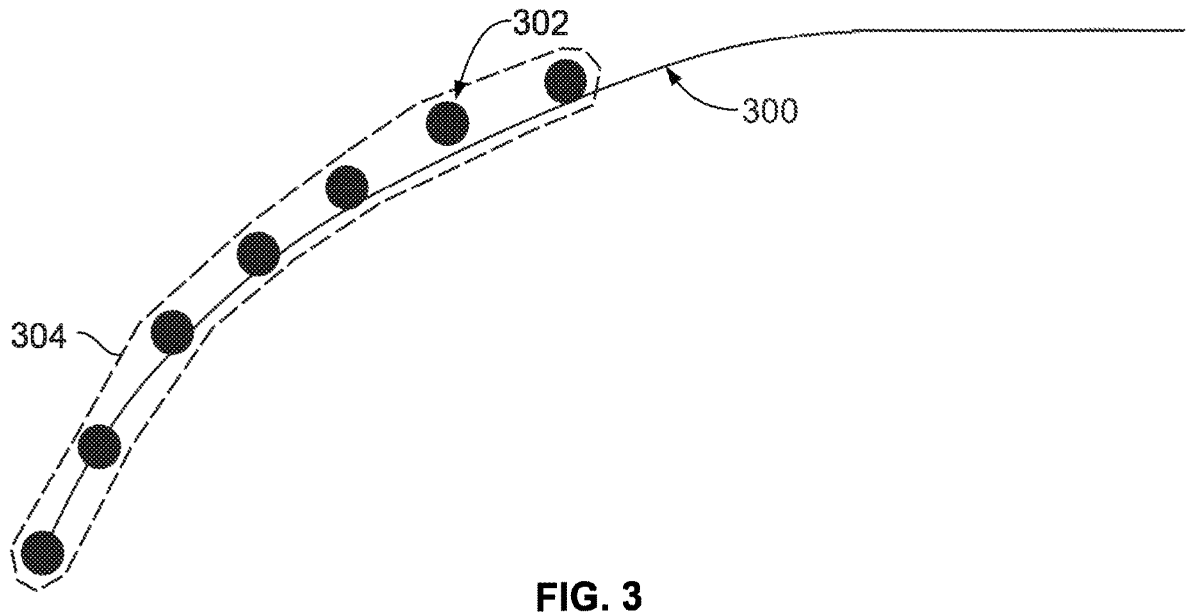
FIG. 3 illustrates another example of a stored layout of a route segment compared with reported locations of the vehicles in the vehicle system shown in FIG. 1.

FIGS. 2 and 3 illustrate examples of stored layouts 200, 300 of a route segment compared with reported locations 202, 302 of the vehicles 104, 106 in the vehicle system 102 (shown in FIG. 1). The controller 114 (shown in FIG. 1) can use the reported locations of the vehicles to verify the contents of a route database. A tangible and non-transitory computer readable medium, such as a computer memory (e.g., a computer hard drive, optical disc, or the like) can be onboard the vehicle system and can store layouts of routes. The layouts may be geographic locations of routes, curvatures of routes, intersections between routes, or the like. The controller and/or operator onboard the vehicle system can use the information stored in the route database to control movement of the vehicle system.

The controller can use the self-reported locations of the vehicles in the vehicle system to determine a layout 204, 304 of the vehicle system. This vehicle system layout may be a combination or set of the locations of the vehicles. The controller can compare the vehicle system layout with the stored layout of the route segment. If the vehicle locations represented by the vehicle system layout correspond with the stored layout of the route, then the controller can verify that the stored layout of the route is accurate. But, if the vehicle locations represented by the vehicle system layout do not correspond with the stored layout of the route, then the controller can determine that the stored layout of the route is not accurate.

For example, the locations of the vehicles in the vehicle system layout shown in FIG. 2 are not located over or within a threshold distance (e.g., ten meters) of the stored route layout. The stored route layout has a curve with a smaller radius of curvature than a path along which the vehicle locations extends along. The controller can determine that the route database is not accurate for the illustrated route segment. The controller can modify the route database (to change the stored layout to match or more closely match the vehicle system layout), request that the route database be modified, or the like, based on these differences. In contrast, the locations of the vehicles in the vehicle system layout shown in FIG. 3 are located over or within the threshold distance of the stored route layout. The controller can determine that the route database is accurate for the illustrated route segment.

Figure 4:
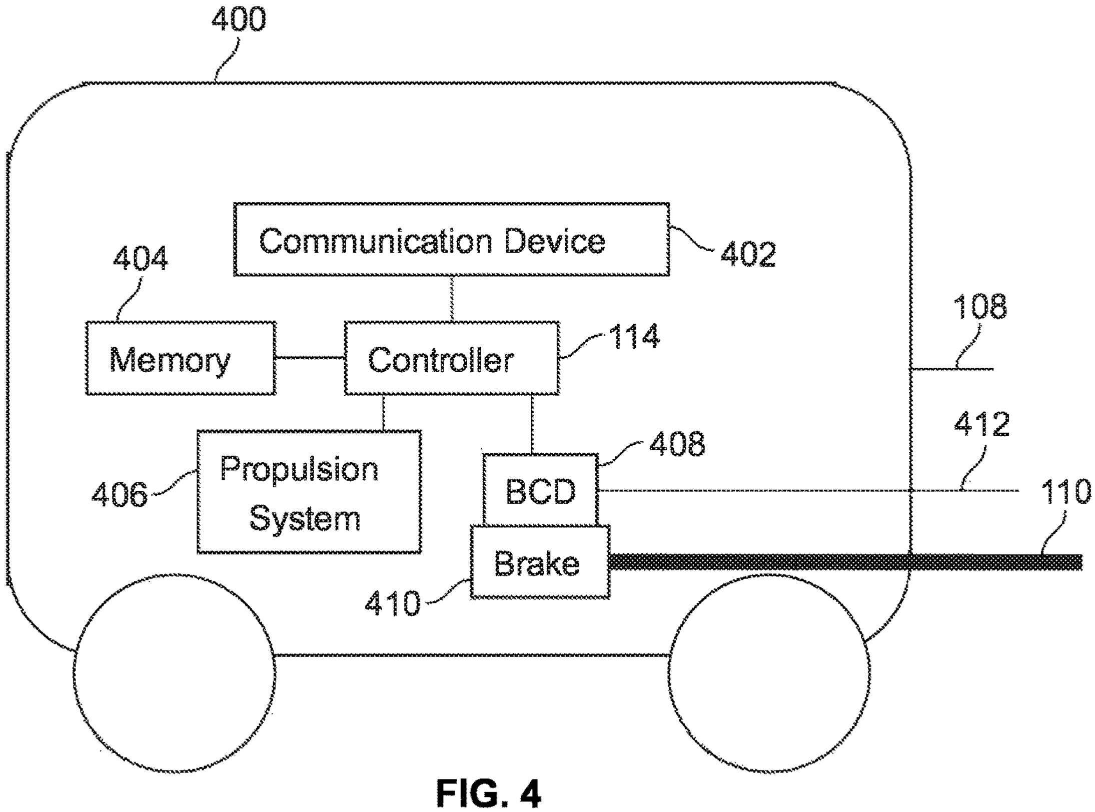
FIG. 4 illustrates one example of a propulsion-generating vehicle.

FIG. 4 illustrates one example of a propulsion-generating vehicle 400. The propulsion-generating vehicle can represent one or more of the vehicles 104 shown in FIG. 1. The propulsion-generating vehicle includes the controller 114 and a communication device 402 that communicates with the other vehicles in the vehicle system and may communicate with vehicles or other systems that are not in the same vehicle system as the propulsion-generating vehicle. The communication device can represent transceiving circuitry, one or more antennas, modems, or the like, that communicate via wired and/or wireless pathways. A memory 404 can represent the tangible and non-transitory computer readable storage medium described above. For example, the memory may include or represent the route database. A propulsion system 406 represents one or more engines, generators, alternators, motors, or the like, that operate to propel the propulsion-generating vehicle.

A brake control device 408 ("BCD" in FIG. 4) represents hardware circuitry that controls a brake 410 of the propulsion-generating vehicle. For example, the brake can represent an air brake that is controlled by the brake control device. The brake control device can represent an individually addressable electronically controlled pneumatic (ECP) device that controls the brake to engage or release. The brake can be fluidly coupled with the brake pipe 110 that extends along the length of the vehicle system. The brake control device can direct the air brake to reduce pressure in a brake cylinder to engage the brake or can control a valve to direct air from the brake pipe into the brake cylinder to release the brake. The brake control device can be coupled with a cable 412 that extends along part or all of the vehicle system. The cable can represent a train line or other conductive pathway through which control signals are communicated. Control signals can be communicated from the controller to the brake control devices onboard other vehicles in the vehicle system via the cable. These control signals may direct the brake control devices on the vehicles to engage or release the respective brakes. The control signals can be individually addressable to instruct the brake control devices onboard different vehicles to engage or release the brakes to different amounts, settings, etc. at the same time.

Figure 5:
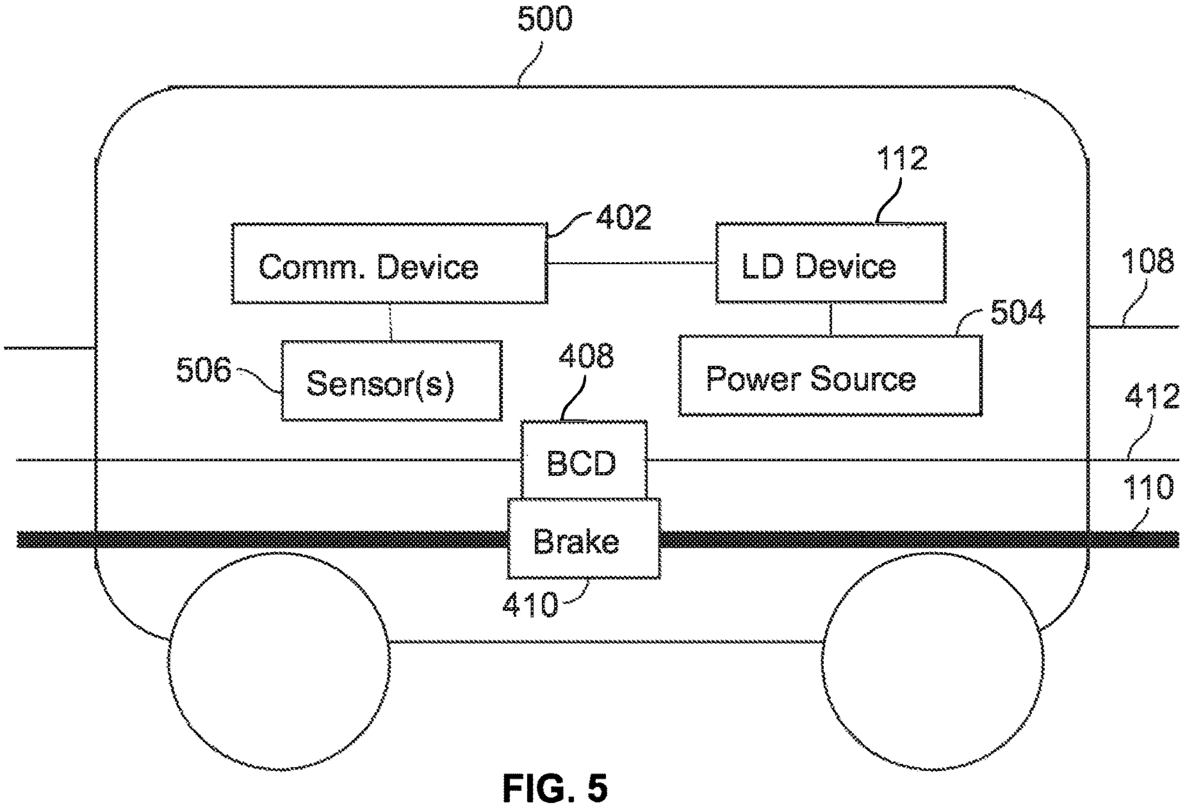
FIG. 5 illustrates one example of a non-propulsion-generating vehicle.

FIG. 5 illustrates one example of a non-propulsion-generating vehicle 500. The non-propulsion-generating vehicle can represent one or more of the vehicles 106 shown in FIG. 1. The non-propulsion-generating vehicle includes the communication device 402 described above to allow the non-propulsion-generating vehicle to communicate with the controlling vehicle (and, optionally, other vehicles). The non-propulsion-generating vehicle includes the brake control device 408 for controlling the brake 410 of the non-propulsion-generating vehicle.

The non-propulsion-generating vehicle includes a location determining device 112 ("LD Device" in FIG. 5) that determines the location of the non-propulsion-generating vehicle. The location determining device can represent a GPS receiver. Optionally, the location determining device can represent a wireless triangulation device, a dead reckoning system, or the like, that operates to output a location of the location determining device and the non-propulsion-generating vehicle. Although not shown in FIG. 4, the vehicle 104 also may include a location determining device.

A power source 504 can provide electric current to the location determining device and/or other components of the non-propulsion-generating vehicle. The power source can represent one or more batteries, capacitors, or the like. Optionally, the location determining device can be powered by an off-board source, such as a power source onboard another vehicle in the same vehicle system.

A sensor 506 represents one or more devices that measure or detect one or more characteristics of the non-propulsion-generating vehicle. The sensor can represent one or more pressure sensors that measure pressures in the brake pipe, in the brake cylinder of the brake, in one or more brake reservoirs, etc. Optionally, the sensor can represent a temperature sensor that measures temperatures of the non-propulsion-generating vehicle. The communication device can send signals to the controlling vehicle that include the location of the vehicle as determined by the location determining device, the characteristic(s) monitored by the sensor, etc.

The controller of the controlling vehicle can use the self-reported locations of the vehicles in the vehicle system to determine which brake control devices in the vehicle system to direct to engage brakes, what settings to engage the brakes, which brake control devices in the vehicle system to direct to release brakes, throttle settings of propulsion-generating vehicles, etc. The brake control devices can be individually addressed by control signals sent by the controller. For example, each brake control device may have a unique identifier or address. The controller can broadcast and/or transmit control signals that include the identifier or address of one or more brake control devices to individually control the brakes in the vehicle system. For example, the controller can broadcast a signal that directs the brake control device of the vehicle 106A to engage the brake of the vehicle 106A to a first setting (that generates a first braking effort), directs the brake control device of the vehicle 106B to concurrently or simultaneously engage the brake of the vehicle 106B to a different, second first setting (that generates a different, second braking effort), and so on. The controller can determine which brakes to control based on the locations of the vehicles, as described above.

The controller can determine health states of the brakes onboard the vehicles based on the characteristics that are communicated by the sensors of the vehicles. For example, the controller can determine whether pressures in the brake system are too high or too low, whether communication with a brake control device is interrupted (potentially indicating failure of the brake control device), etc., and may determine that the brake has failed or is no longer fully functional. The controller can control operation of one or more other brakes in the vehicle system based on the health state that is determined. For example, responsive to determining that a brake or brake control device of the vehicle 106D is not operating properly, the controller can individually direct the brakes of the vehicles near the vehicle 106D to engage. The controller can instruct the brake control devices of the vehicles 106C, 106E to engage the corresponding brakes or to engage the corresponding brakes to an increased setting to make up for the decreased health or state of the brake of the vehicle 106D.

The controller can select the brake control devices to engage the brakes or to change settings of the brakes based on how close the vehicles are to the vehicle having the decreased health or state. For example, responsive to determining that the brake or brake control device of the vehicle 106D is not operating properly, the controller can determine which other vehicles are within a threshold distance (e.g., the length of three vehicles, fifty meters, etc.) of the vehicle 106D. The controller can determine which vehicles are within the threshold distance of the vehicle 106D based on the self-reported locations from the vehicles. The controller can then direct those vehicles that report locations within the threshold distance to the vehicle 106D to engage the respective brakes of those vehicles.

Figure 6:
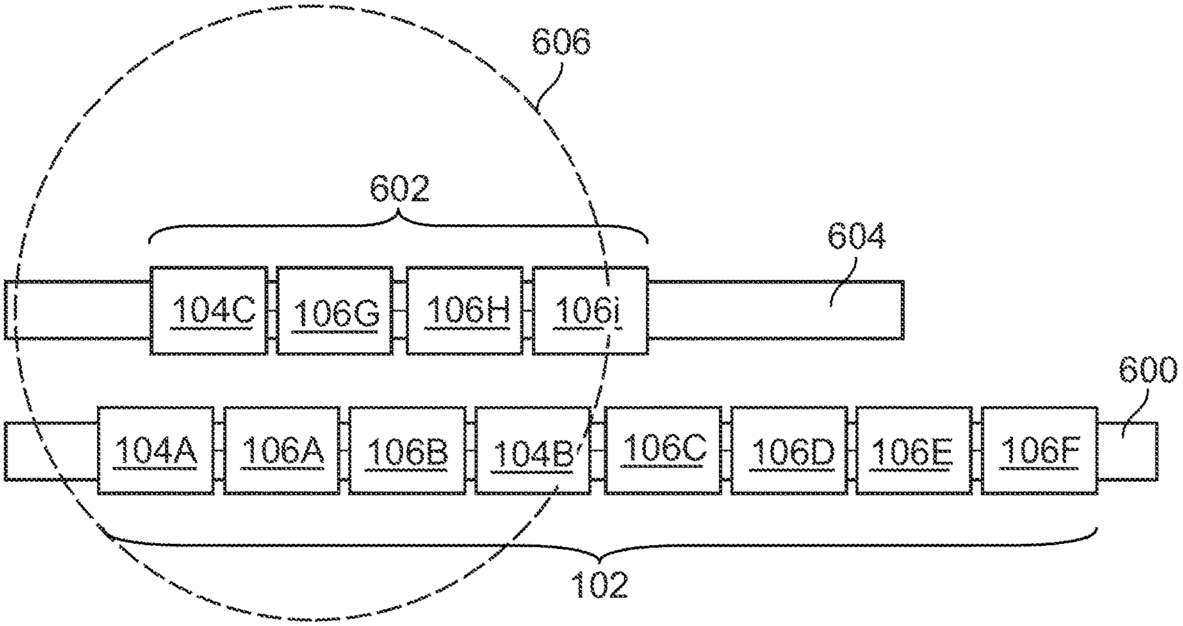
FIG. 6 illustrates another view of the vehicle system shown in FIG. 1.

FIG. 6 illustrates another view of the vehicle system 102 shown in FIG. 1. The vehicle system 102 is on a first route 600 and a nearby vehicle system 602 is on a different, second route 604. The nearby vehicle system 602 can be formed from one or more other vehicles 104, 106, such as vehicles 104C and vehicles 106G-I.

The controller of the vehicle system 102 can use the self-reported locations of the vehicles 104, 106 in the vehicle system 102 to reduce or eliminate the impact of cross-talk between the vehicle systems 102, 602. The vehicle systems 102, 602 may be sufficiently close to each other that the controller vehicle 104A in the vehicle system 102 is within a wireless communication range 606 of a vehicle in the vehicle system 602 (e.g., the vehicle 106G). As a result, the controller vehicle 104A may receive communications sent by the vehicle 106G (intended for the controller vehicle 104C of the vehicle system 602).

The controller can use the self-reported locations of the vehicles (other than the controlling vehicle) to determine whether a signal received from one or more of the vehicles in the same vehicle system. For example, the controller can examine a signal that is wirelessly received from another vehicle. This signal can include the location of the vehicle sending the signal, and may include other information (e.g., sensed characteristics, a current brake setting, etc.). The controller can examine the location of the vehicle that sent the signal to determine whether the location indicates that the vehicle is on the same route 600 as the controlling vehicle.

For example, the controller onboard the vehicle 104A can examine a signal received from the vehicle 106G. The controller examines the self-reported location of the vehicle 106G and determines that the vehicle 106G is located on a different route 604 than the vehicle system 102. The controller can make this determination based on route layout information for the routes 600, 604 that is stored in the memory 404. The controller can then disregard the signal received from the vehicle 106G. The controller can disregard the signal by not using information contained in the signal to control or change movement of the vehicle system 102. This reduces or eliminates the impact on cross-talk between the vehicle systems 102, 602.

In contrast, the controller onboard the vehicle 104A can examine a signal received from the vehicle 106B, examine the self-reported location of the vehicle 106B, examine the route layout information for the route 600, and determines that the vehicle 106B is located in the same route 600 as the vehicle system 102. The controller also can determine that the vehicle 106B is within a threshold distance (e.g., the length of the vehicle system 102) based on the self-reported location of the vehicle 106B) to verify that the vehicle 106B is in the same vehicle system 102 as the controller. The controller can then use the information included in the received signal to control or change movement of the vehicle system 102, as described herein.

Figure 7:
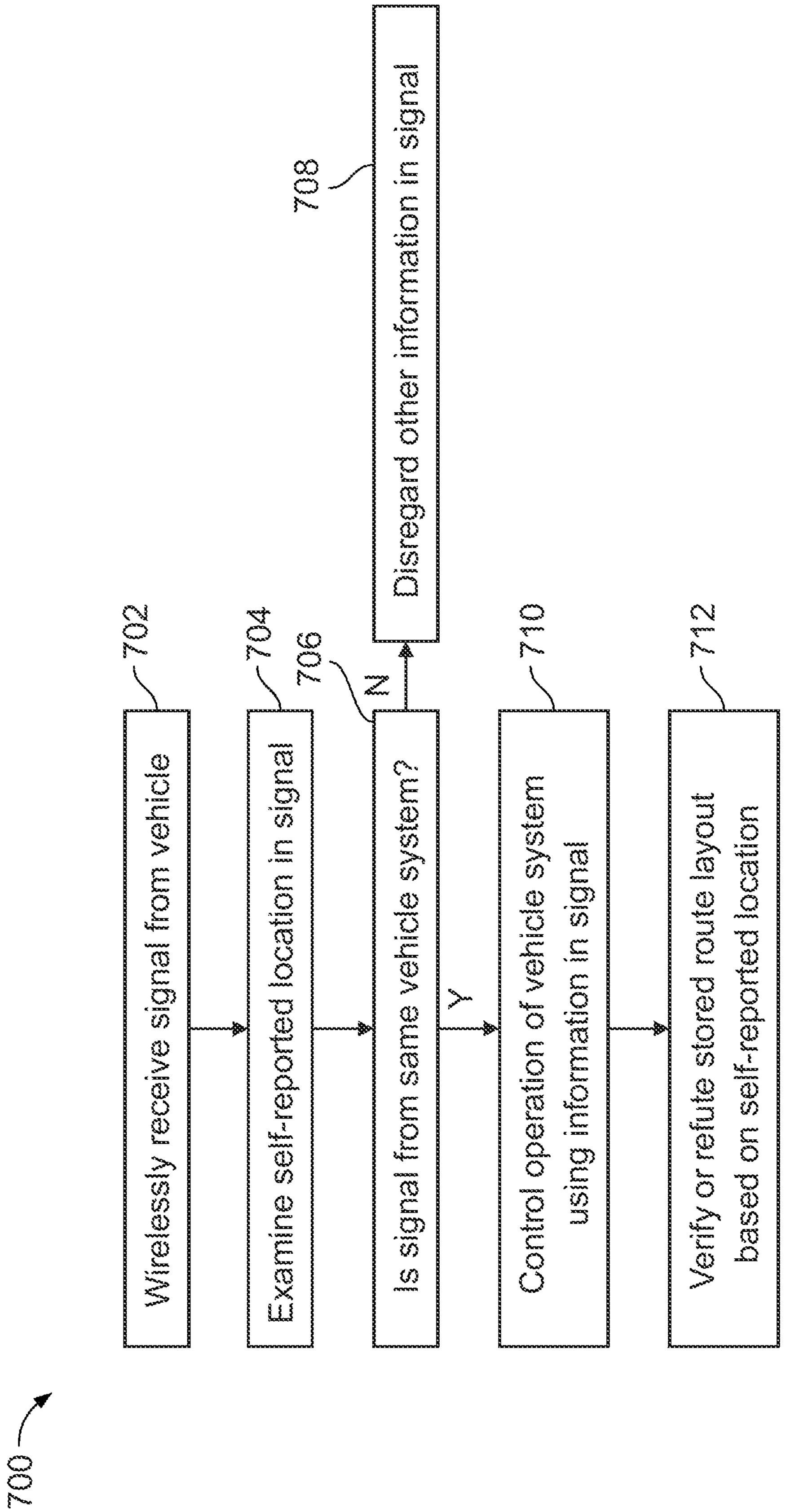
FIG. 7 illustrates a flowchart of one example of a method for controlling operation of a vehicle system.

FIG. 7 illustrates a flowchart of one example of a method 700 for controlling operation of a vehicle system. The method 700 can represent operations performed by the controller of the vehicle system. At 702, a signal is wirelessly received from another vehicle. For example, the communication device can wirelessly receive a signal sent from another vehicle. The received signal can include a self-reported location of the vehicle from which the signal originated. At 704, the location received in the signal is examined. For example, the controller can determine how far the received location is from the vehicle in which the controller is located, can determine whether the received location is on a route that the vehicle in which the controller is located also is on, etc. at 706, a determination is made as to whether the signal was received from a vehicle that is in the same vehicle system as the controller. For example, the controller can determine whether the received location is farther than a threshold distance corresponding to the length of the vehicle system. If the received location is farther than this threshold distance, then the controller can determine that the vehicle that sent the signal is not in the same vehicle system as the controller. If the received location is not farther than this threshold distance, then the controller may determine that the vehicle that sent the signal is in the same vehicle system as the controller. As an additional or alternative check, the controller can determine whether the received location is on the same route as the vehicle system of the controller. The controller can compare the received location to locations of the route on which the vehicle system is disposed. If the received location is not on the layout of the route, then the controller can determine that the vehicle that sent the signal is not in the same vehicle system as the controller. If the received location is on the layout of the route, then the controller may determine that the vehicle that sent the signal is in the same vehicle system as the controller.

If the signal is identified as being sent from a vehicle in the same vehicle system as the controller, then flow of the method 700 can proceed toward 710. But, if the signal is identified as being sent from a vehicle that is not in the same vehicle system as the controller, then flow of the method 700 can proceed toward 708.

At 708, the information included in the signal is disregarded. For example, the controller may ignore or may not change operation of the vehicle system based on any additional information contained in the received signal. The information can be ignored by the controller to prevent the controller from changing movement of the vehicle system due to cross-talk with another vehicle system. Flow of the method 700 can terminate or return to one or more previous operations (e.g., 702).

At 710, operation of the vehicle system can be controlled based on information contained in the received signal. For example, after verifying that the signal is received from a vehicle in the same vehicle system as the controller, the controller can determine a sequence of the vehicles in the vehicle system, individually change or otherwise engage brakes, change throttle settings, or the like, using information included in the signal, as described herein.

At 712, a route layout stored in a memory can be verified or refuted based on the location included in the signal. For example, the controller can compare self-reported locations that are determined to be in the same vehicle system and compare these locations to a stored layout of the route (on which the vehicle system is traveling). If the locations differ from the stored route layout, then the controller can determine that the stored layout of the route is incorrect. The controller optionally can modify the stored route layout to correspond to the locations of the vehicles or may generate an alert or request to update the stored route layout. If the locations do not differ from the stored route layout, then the controller can determine that the stored layout of the route is correct. Flow of the method 700 can terminate or return toward one or more other operations (e.g., 702).

In one embodiment, a method includes receiving vehicle makeup information from multiple vehicles in a multi-vehicle system. The vehicle makeup information represents one or more characteristics of the vehicles. The vehicle makeup information received at a controlling vehicle of the vehicles in the multi-vehicle system that controls movement of the multi-vehicle system. The method also includes receiving, at the controlling vehicle, locations from location-determining devices respectively onboard the vehicles in the multi-vehicle system, and controlling, with the controlling vehicle, operation of the multi-vehicle system using a combination of the vehicle makeup information received from the vehicles and the locations of the vehicles.

Optionally, the method also can include determining a sequence of the vehicles in the multi-vehicle system using the locations of the vehicles that are received at the controlling vehicle. The operation of the multi-vehicle system can be controlled using the vehicle makeup information and the sequence of the vehicles.

Optionally, the method also includes determining a shape of a path over which the multi-vehicle system extends using the locations of the vehicles that are received, comparing the shape of the path over which the multi-vehicle system extends with a shape of a route that is stored in a route database, and one or more of verifying or modifying the shape of the route that is stored in the route database based on comparing the shape of the path with the shape of the route.

Optionally, the vehicles include individually addressable brake control devices configured to be controlled by the controlling vehicle. The operation of the multi-vehicle system can be controlled by controlling one or more of the brake control devices based on the locations of the vehicles that are received.

Optionally, the method can include determining a state of a first brake in the multi-vehicle system. At least a second brake in the multi-vehicle system can be controlled based on the state of the first brake and based on the location of at least the second brake.

Optionally, the first brake and the second brake are disposed onboard different vehicles of the vehicles in the multi-vehicle system.

Optionally, the first brake is disposed onboard a first vehicle of the vehicles in the multi-vehicle system and the state that is determined indicates that the first brake has failed. The method also can include determining that the second brake is disposed onboard a second vehicle of the vehicles in the multi-vehicle system that is within a threshold distance from the first vehicle, and changing engagement of the second brake based on the state of the first brake and the second vehicle being within the threshold distance from the first vehicle.

Optionally, the method also can include receiving a signal at the controlling vehicle from a first vehicle in the multi-vehicle system or a second vehicle that is not in the multi-vehicle system, and determining whether the location of the first vehicle or the second vehicle that sent the signal is located on a first route segment that the controlling vehicle also is located. The operation of the multi-vehicle system can be controlled based on the signal that is received responsive to determining that the signal is received from the first vehicle that is in the multi-vehicle system and that the signal is not received from the second vehicle that is not in the multi-vehicle system.

Optionally, the method can include receiving a signal at the controlling vehicle from a first vehicle in the multi-vehicle system or a second vehicle that is not in the multi-vehicle system, and determining whether the location of the first vehicle or the second vehicle that sent the signal is located on a first route segment that the controlling vehicle also is located. The operation of the multi-vehicle system may not be controlled based on the signal that is received responsive to determining that the signal is received from the second vehicle that is not in the multi-vehicle system and that the signal is not received from the first vehicle that is in the multi-vehicle system.

In one embodiment, a control system includes a controller configured to be disposed onboard a controlling vehicle of a multi-vehicle system. The controller is configured to receive vehicle makeup information from multiple other vehicles in the multi-vehicle system. The vehicle makeup information representing one or more characteristics of the other vehicles. The controller also is configured to receive locations from location-determining devices respectively onboard the other vehicles in the multi-vehicle system and to control operation of the multi-vehicle system using a combination of the vehicle makeup information received from the other vehicles and the locations of the other vehicles.

Optionally, the controller also is configured to determine a sequence of the vehicles in the multi-vehicle system using the locations of the vehicles that are received at the controlling vehicle. The controller is configured to control the operation of the multi-vehicle system using the vehicle makeup information and the sequence of the vehicles.

Optionally, the controller is configured to determine a shape of a path over which the multi-vehicle system extends using the locations of the other vehicles that are received, compare the shape of the path over which the multi-vehicle system extends with a shape of a route that is stored in a route database, and one or more of verify or modify the shape of the route that is stored in the route database based on comparing the shape of the path with the shape of the route.

Optionally, the other vehicles include individually addressable brakes configured to be controlled by the controlling vehicle. The controller can be configured to control the operation of the multi-vehicle system by controlling one or more of the brakes based on the locations of the other vehicles that are received.

Optionally, the controller can be configured to determine a state of a first brake of the brakes in the multi-vehicle system. The controller also can be configured to control at least a second brake of the brakes in the multi-vehicle system based on the location of the first brake and based on the location of at least the second brake.

Optionally, the first brake is disposed onboard a first vehicle of the other vehicles in the multi-vehicle system and the state that is determined indicates that the first brake has failed.

Optionally, the controller is configured to determine that the second brake is disposed onboard a second vehicle of the other vehicles in the multi-vehicle system that is within a threshold distance from the first vehicle and to change engagement of the second brake based on the state of the first brake and the second vehicle being within the threshold distance from the first vehicle.

Optionally, the controller is configured to receive a signal at the controlling vehicle from a first vehicle in the multi-vehicle system or a second vehicle that is not in the multi-vehicle system and determine whether the location of the first vehicle or the second vehicle that sent the signal is located on a first route segment that the controlling vehicle also is located. The controller can be configured to control the operation of the multi-vehicle system based on the signal that is received responsive to determining that the signal is received from the first vehicle that is in the multi-vehicle system and that the signal is not received from the second vehicle that is not in the multi-vehicle system.

In one embodiment, a method includes receiving different location signals from different non-propulsion vehicles of a multi-vehicle system at a propulsion vehicle of the multi-vehicle system. The location signals indicate different locations of the non-propulsion vehicles. The method also includes determining a sequence of the non-propulsion vehicles in the multi-vehicle system based on the locations that are received, and controlling brakes onboard the non-propulsion vehicles based on the sequence of the non-propulsion vehicles.

Optionally, controlling the brakes includes individually engaging a first brake of the brakes responsive to at least a second brake of the brakes failing. The first brake can be engaged based on the location of the non-propulsion vehicle that includes the first brake.

Optionally, controlling the brakes includes disregarding a signal received by a controller onboard the propulsion vehicle from a second non-propulsion vehicle that is not included in the multi-vehicle system based on a second location signal received from the second non-propulsion vehicle.

Embodiments of the subject matter described herein relate to vehicle control systems and methods. In some embodiments, the vehicle system may be a multi-vehicle system, and two or more propulsion-generating vehicles of the system may be controlled to be operated according to a first set of operating conditions while the vehicle system is moving. Operating according to the first set of operating conditions may enable the two or more propulsion-generating vehicles to contribute an amount of effort to propel the vehicle system to move along the route. The effort may be tractive effort and/or braking effort.

In some embodiments, while the vehicle system is moving along the route, a determination may be made of a revised amount of effort that at least one propulsion-generating vehicle needs to contribute to propel the vehicle system. The revised amount of effort may be to control one or more performance variables of the vehicle system. The performance variables may include forces between adjacent or neighboring vehicles, forces on couplers or coupling features between adjacent vehicles, states of the couplers, a state of charge of an energy storage device of the vehicle system, or the like. Responsive to determining the revised amount of effort, the vehicle system may change from being controlled according to the first set of operating conditions to being automatically controlled according to a second set of operating conditions. At least one propulsion-generating vehicle may contribute the revised amount of effort while the vehicle system operates according to the second set of operating conditions.

Figure 8:
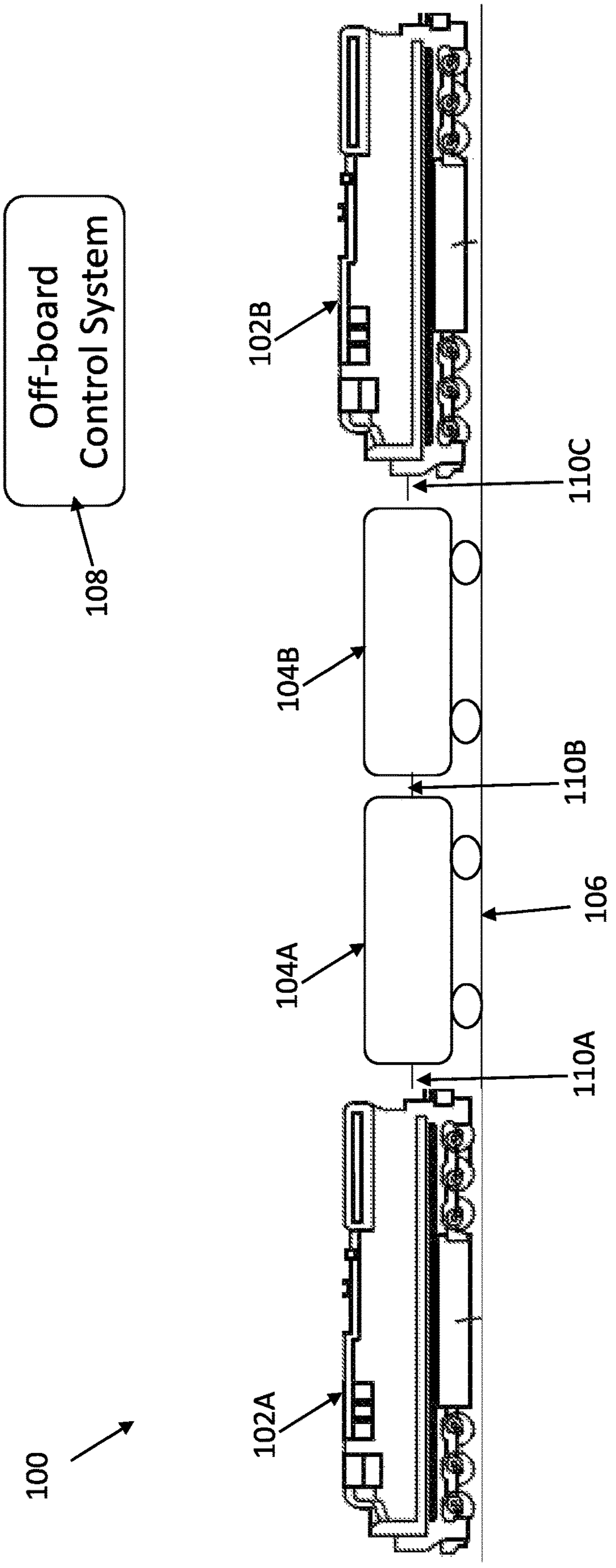
FIG. 8 illustrates one example of a multi-vehicle system in accordance with one embodiment.

FIG. 8 illustrates one example of a multi-vehicle system 100. The vehicle system is formed from multiple propulsion-generating vehicles 102A, 102B, and one or more non-propulsion-generating vehicles 104A, 104B. The number and/or arrangement of the vehicles 102, 104 in the vehicle system may differ from what is shown in FIG. 8. In the illustrated embodiment, the propulsion-generating vehicles are locomotives and the non-propulsion-generating vehicles are rail cars, but alternatively, these vehicles may not be rail vehicles. For example, the vehicles may be automobiles, trucks (with or without trailers), buses, aircraft (e.g., fixed wing, drones, rotary wing, etc.), mining vehicles, agricultural vehicles, marine vessels, or the like. The multi-vehicle systems described herein (rail vehicle systems or other vehicle systems that do not travel on rails or tracks) can be formed with vehicles mechanically coupled with each other (e.g., by couplers), or can be logically coupled without being mechanically coupled. For example, vehicles may be logically but not mechanically coupled when the separate vehicles communicate with each other to coordinate movements of the vehicles with each other so that the vehicles travel together (e.g., as a convoy, swarm, platoon, fleet, or the like).

The neighboring or adjacent vehicles in the vehicle system are mechanically coupled with each other by couplers 110A-C. Alternatively, two or more of the vehicles may be logically coupled but not mechanically coupled, such as where the logically coupled vehicles are separate by communicate with each other to coordinate movements (e.g., to travel as a convoy). In the illustrated embodiment, the vehicle 102A can be referred to as a lead propulsion-generating vehicle, as this vehicle controls or directs the operational settings of the remote propulsion-generating vehicle 102B to control movement of the vehicle system along a route 106. While the lead vehicle is shown at a leading end of the vehicle system, the lead vehicle may be in another location in the consist. In one or more embodiments, the lead vehicle may issue commands via control signals that are directly or indirectly communicated (wirelessly and/or wired communication) to the other propulsion-generating vehicle(s) in the vehicle system. The lead vehicle may generate or create the control signals (such as via an energy management system of the lead vehicle) that are communicated to the other propulsion-generating vehicles. Optionally, the lead vehicle, and/or the other propulsion-generating vehicle may receive control signals from an off-board control system 108. The off-board control system can represent hardware circuitry that includes or is connected with one or more processors (e.g., one or more integrated circuits, field programmable gate arrays, microprocessors, or the like), that perform one or more of the operations described herein. In one embodiment, the off-board control system may communicate the control signals to the lead propulsion-generating vehicle, and the lead propulsion-generating vehicle may relay (the same control signals or modified control signals) to each of the other propulsion-generating vehicles. In another embodiment, the off-board control system may communicate control signals to each of the propulsion-generating vehicles of the vehicle system.

The control signals may dictate operational settings of the propulsion-generating vehicles as a function of time, distance, and/or location (e.g., to reduce consumed fuel, generated emissions, generated noise, or the like). The operational settings of each of the different propulsion-generating vehicles may control efforts provided by each of the propulsion-generating vehicles to control movement of the vehicle system and to propel the vehicle system to move along the route. For example, distributed power (DP) control may be used to control multiple propulsion-generating vehicles distributed throughout the length of the vehicle system and an amount of effort provided by each of the propulsion-generating vehicles. The efforts may be braking efforts, tractive efforts, or a combination of the two. For example, the lead vehicle may be directed to operate according to first operating settings at a first location to contribute a first amount of effort, and the remote propulsion-generating vehicle may be directed to operate according to second operating settings (that may be different than or the same as the first operating settings) at the first location to contribute a second amount of effort.

The operating settings of the propulsion-generating vehicles may be determined based on the time, distance, and/or location of the vehicles to coordinate the efforts provided by each of the vehicles at the different times, distances, and/or locations along the route. For example, the lead propulsion-generating vehicle may be operated to contribute a first amount of effort (e.g., tractive effort), and the remote propulsion-generating vehicle may be operated to contribute a different, second amount of effort (e.g., tractive effort) at a location along the route. The different contributions of efforts may be to control one or more performance variables of the vehicle system. The performance variables may include, but are not limited to, forces between adjacent vehicles of the vehicle system (e.g., tension forces, compression forces, or the like), forces on couplers between the adjacent vehicles, states of different couplers between adjacent vehicles (e.g., a health state of the couplers, an amount of wear, an age of the couplers, or the like), a state of charge of an energy storage device of the vehicle system (e.g., a battery, or the like), or the like.

Figure 9:
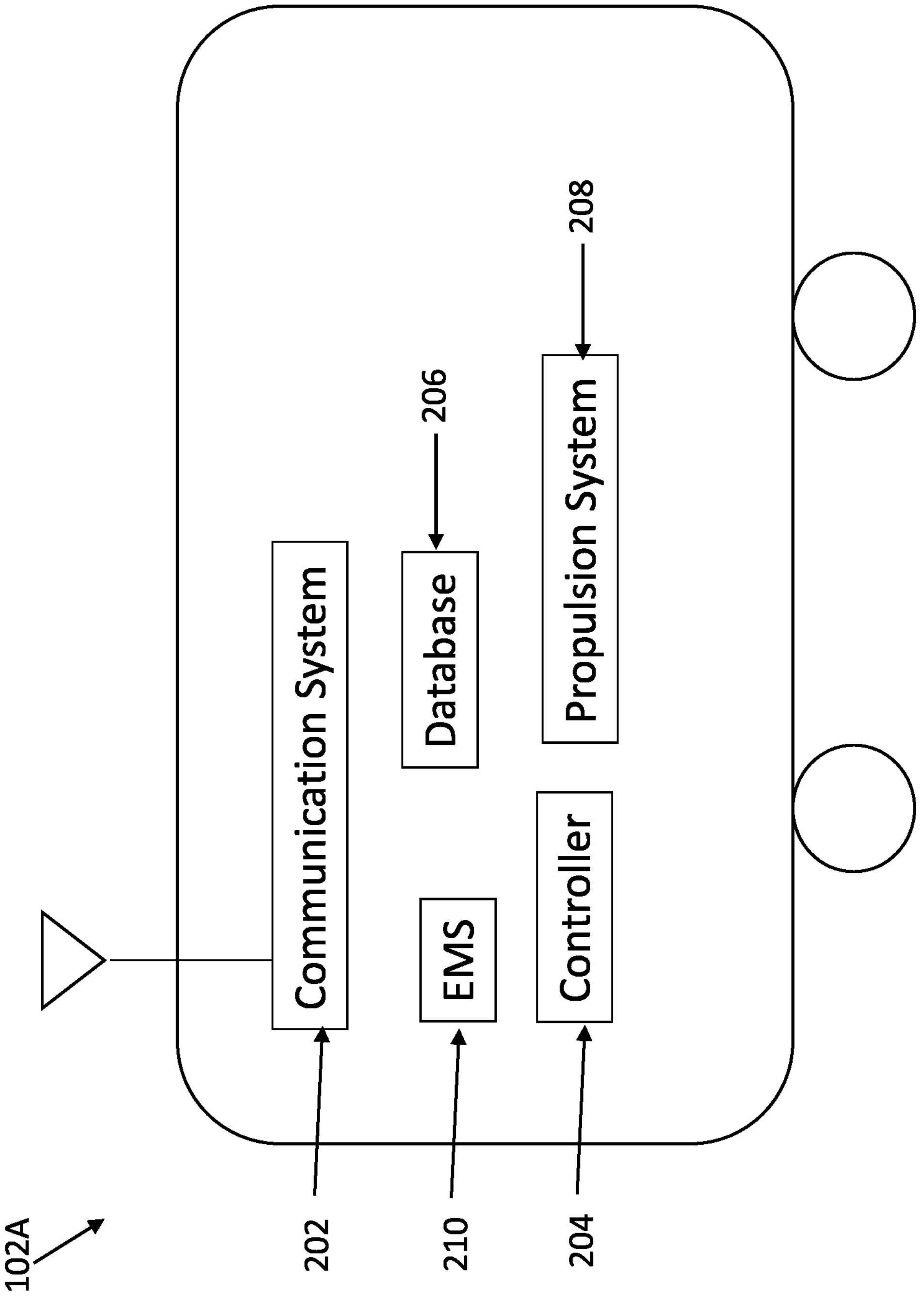
FIG. 9 illustrates a propulsion-generating vehicle of the vehicle system show in FIG. 8.

FIG. 9 illustrates one example of one of the propulsion-generating vehicles of the vehicle system shown in FIG. 8. The vehicle includes a controller 204 that represents hardware circuitry that includes or is connected with one or more processors (e.g., one or more integrated circuits, field programmable gate arrays, microprocessors, or the like) that perform the operations described herein. The vehicle includes a communication system 202 that represents transceiving hardware (e.g., antennas, wires, cables, modems, codecs, or the like) that wirelessly communicate the signals or communicate the signals described herein via wired connections.

In response to receiving a control signal or based on a received control signal (e.g., generated by the off-board controller and received by the propulsion-generating vehicles, generated by the lead propulsion-generating vehicle and received by the other propulsion-generating vehicles, or the like), the controller can direct a propulsion system 208 onboard the corresponding propulsion-generating vehicle to generate tractive effort and/or braking effort according to the control signal. The propulsion system can represent one or more engines, alternators, generators, motors, or the like, that operate to propel the vehicle (and vehicle system) and/or brake the vehicle or vehicle system (e.g., using dynamic braking).

The vehicle can include an energy management system (EMS) 210 that represents hardware circuitry that includes or is connected with one or more processors that determine operational settings of the vehicle system. For example, the energy management system can determine throttle settings, speeds, brake settings, accelerations, or the like, for different vehicles at different times, locations, distances, etc., to cause the vehicle system to arrive at a location within a scheduled time but while consuming less fuel, consuming less electric energy, generating less noise, and/or generating fewer emissions when compared to the same vehicle system arriving at the same location within the same scheduled time but using different operational settings. The energy management system may store information or access information on a profile of the vehicle system from a database 206 to determine the operational settings. The profile can indicate or identify which propulsion-generating vehicles are in the vehicle system, locations of the different propulsion-generating vehicles (e.g., relative to each other propulsion-generating vehicles, a geospatial location of the vehicles, or the like), locations of non-propulsion-generating vehicles, a weight of one or more of the vehicles, a combined weight of the vehicle system, types of couplers between the adjacent vehicles, or the like.

Figure 10:
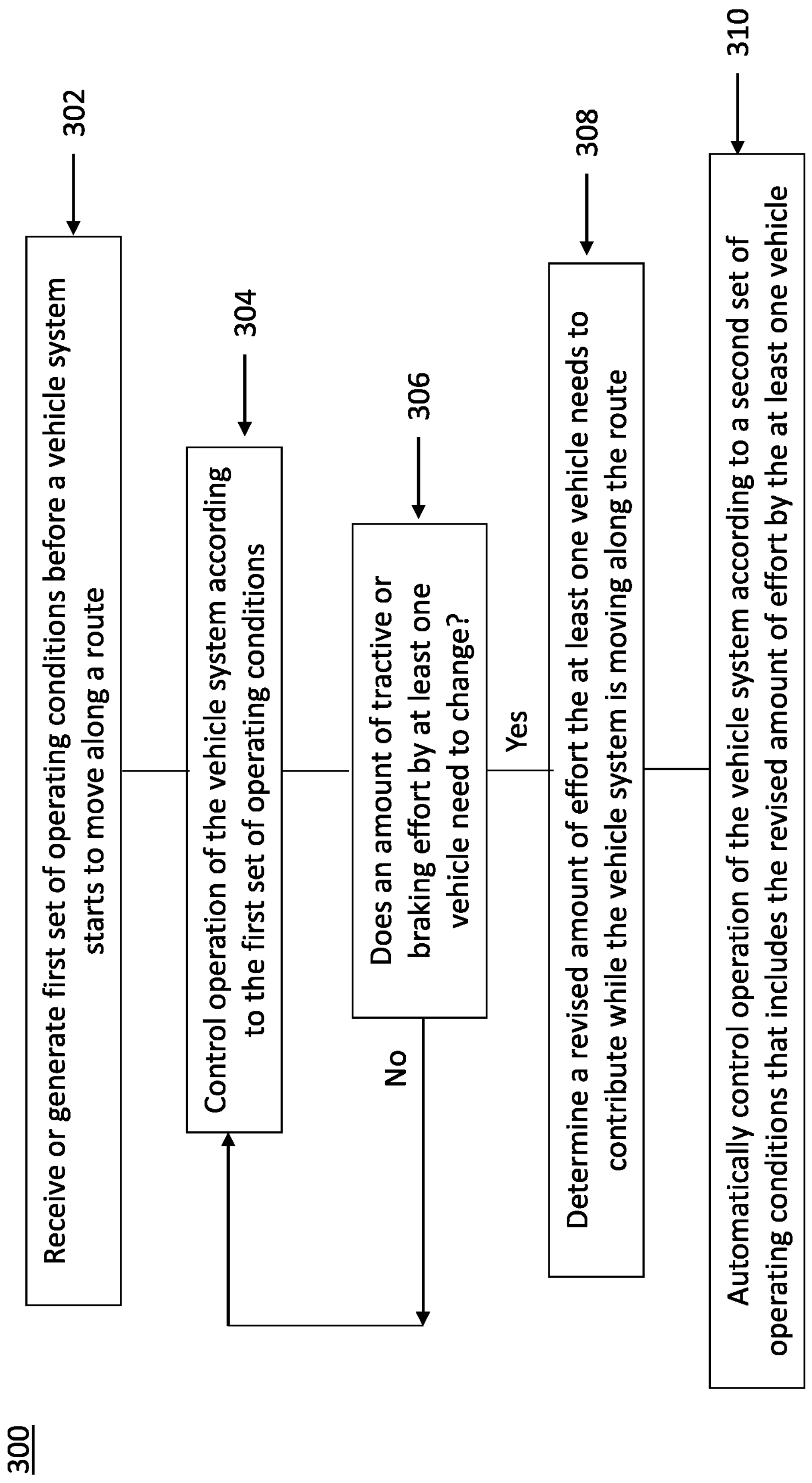
FIG. 10 illustrates a flowchart of one example of a method for controlling operation of a vehicle system.

FIG. 10 illustrates a flowchart 300 of one example of a method for controlling movement of a vehicle system. The method can represent operations performed by the controller(s) of the propulsion-generating vehicles and/or the off-board control system shown in FIGS. 8 and 9 to control movement of a multi-vehicle system shown in FIG. 8.

At step 302, a first set of operating conditions may be received by the vehicle system while the vehicle system is stationary and before the vehicle system starts to move along the route, such as for a trip. The first set of operating conditions may be generated by the off-board control system and communicated to the vehicle system. Optionally, the lead propulsion-generating vehicle may generate the first set of operating conditions, and the other propulsion-generating vehicles may receive the first set of operating conditions from the lead propulsion-generating vehicle.

The first set of operating conditions may include one or more operating settings for the propulsion-generating vehicles at one or more locations along the route. For example, the first set of operating conditions includes the predetermined amount of effort for the two or more propulsion-generating vehicles at the one or more locations along the route. The first set of operating conditions may be based on route grades and route curvatures of the trip, anticipated environmental conditions in which the vehicle system is expected to be subjected to, a state of charge of one or more energy storage devices of the vehicle system, or the like. The first set received by the lead vehicle may direct the lead vehicle to operate having a first throttle setting at a first location along the route, operate having a second throttle setting at a second location along the route, operate having a first brake setting at a third location along the route, or the like.

At step 304, the propulsion-generating vehicles may be controlled according to the first set of operating conditions to propel the vehicle system to move along the route. In one embodiment, the off-board control system may remotely control operation of the vehicle system according to the first set of operating conditions. In another embodiment, the lead propulsion-generating vehicle may control the propulsion system of the lead vehicle, and may remotely control the propulsion system of the remote propulsion-generating vehicle. In another embodiment, the controllers of the propulsion-generating vehicles may control the propulsion systems of the corresponding vehicles to operate according to the first set of operating conditions.

The first set of operating conditions may be based on a predetermined amount of effort (e.g., tractive effort and/or braking effort) the different propulsion-generating vehicles are to produce to contribute to the vehicle system to move the vehicle system along the route. For example, the first set of operating conditions may indicate throttle or brake settings for controlling the different propulsion-generating vehicles at different locations, times, and/or distances along the route. The propulsion-generating vehicles can collectively produce a tractive effort and/or braking effort, such as to control forces imparted on couplers between the vehicles in the vehicle system, at the different locations along the route.

At step 306, while the vehicle system is moving along the route, a determination is made whether an amount of effort by one or more of the propulsion-generating vehicles needs to change. The amount of effort (e.g., tractive effort and/or braking effort) by one or more of the propulsion-generating vehicles may need to change based on the one or more performance variables of the vehicle system (e.g., forces between successive or adjacent vehicles, forces on couplers between adjacent vehicles, current states of charge of energy storage devices providing electric power to the vehicle system, or the like). In one embodiment, while the vehicle system is moving along the route, a determination may be made that the lead propulsion-generating vehicle, operating according to the first set of operating conditions (e.g., providing a predetermined first amount of tractive effort), may need to provide a revised amount of tractive effort to contribute to propel the vehicle system. For example, the predetermined first amount of tractive effort may be resulting in forces between two or more adjacent vehicles nearing or exceeding a predetermined force threshold (e.g., the adjacent vehicles are stretched too far apart, are bunched too closely together, or the like). The controller(s) of the vehicles and/or the off-board control system may determine that one or more propulsion-generating vehicles may need to contribute a revised amount of effort instead of the predetermined amount of effort, at one or more locations along the route.

If it is determined that none of the propulsion-generating vehicles need to contribute a different or revised amount of effort, or that the predetermined amount of effort is sufficient, then flow of the method returns to step 304, and the vehicle system continues to be controlled according to the first set of operating conditions. Alternatively, if it is determined that the predetermined amount of effort being contributed by at least one propulsion-generating vehicle is insufficient, flow of the method proceeds toward step 308.

At step 308, a revised amount of effort that the at least one propulsion-generating vehicle needs to contribute is determined. For example, the revised amount of effort may be determined while the vehicle system is moving along the route. The revised amount of effort may be determined based on a current speed of movement of the vehicle system, environmental conditions in which the vehicle system is moving, route grades, route curvatures, a total amount of effort from the plural propulsion-generating vehicles of the vehicle system, a state of charge of one or more vehicles (or one or more energy storage devices of the one or more vehicles) of the vehicle system, or the like.

Figure 11:
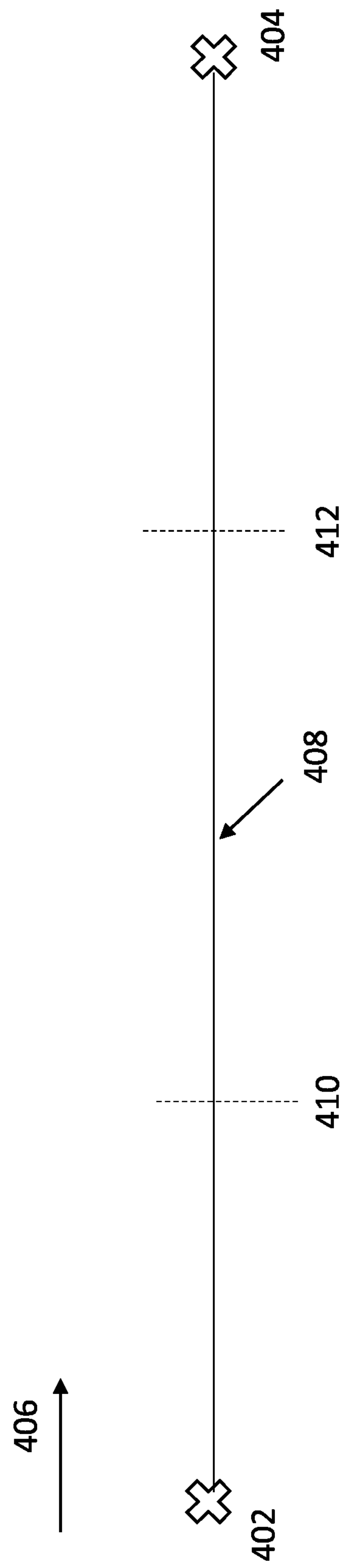
FIG. 11 illustrates a schematic of one example for determining efforts by propulsion-generating vehicles to contribute for controlling operation of a vehicle system moving along a route.

FIG. 11 illustrates a schematic of one example for determining the revised amount of effort and for controlling operation of the vehicle system. A vehicle system, such as illustrated in FIG. 8, may move along a route 408 in a direction of travel 406 between a start location 402 and an end location 404. Before the vehicle system starts the trip or starts moving away from the start location, the vehicle system may receive and/or generate the first set of operating conditions indicative of how the vehicle system should be controlled at one or more locations along the route between the start and end locations. For example, a first propulsion-generating vehicle may be controlled to contribute a first amount of predetermined effort, and a second propulsion-generating vehicle may be controlled to contribute a second amount of predetermined effort (which may be the same or different than the first amount of predetermined effort) between the start location and a first waypoint location 410.

Responsive to reaching, or being within a determined threshold distance away from the first waypoint location, the off-board control system, the controllers of the vehicle system, or the energy management system(s) of the propulsion-generating vehicles may determine a revised amount of effort that the at least one propulsion-generating vehicle should contribute to propel the vehicle system. The revised amount of effort may be determined based on one or more current performance variables of the vehicle system, based on current conditions of the route along which the vehicle system is moving, based on a comparison between the current conditions and anticipated conditions (e.g., the actual grade is different than the anticipated grade of the route, the actual forces between adjacent vehicles is different than anticipated forces between adjacent vehicles, the actual environmental conditions are different than anticipated environmental conditions, or the like), or the like.

In one embodiment, the predetermined amount of effort of a first propulsion-generating vehicle may be compared with the determined revised amount of effort of the first propulsion-generating vehicle to determine whether the predetermined amount of effort needs to change. For example, the predetermined amount of effort may be compared with the determined revised amount of effort, and it may be determined that the predetermined amount of effort is sufficient to control operation of the vehicle system based on the performance variables of the vehicle system. Alternatively, it may be determined that one or more of the vehicles may need to contribute the revised amount of effort. The revised amount of effort may be associated with different operating conditions of the vehicle system relative to the first set of operating conditions. For example, a first vehicle may contribute a first amount of the predetermined effort while the first vehicle operates according to the first set of operating conditions, and the first vehicle may contribute a second amount of revised effort that is different than the first amount of the predetermined effort while the first vehicle operates according to a different, second set of operating conditions.

Returning to FIG. 10, at step 310, one or more processors of the controllers of the vehicle system may automatically change from controlling the vehicle system according to the first set of operating conditions to automatically controlling operation of the vehicle system according to the second set of operating conditions. At least one propulsion-generating vehicle may contribute a revised amount of effort while the vehicle system operates according to the second set of operating conditions. In one or more embodiments, controlling operation of the vehicle system according to the second set of operating conditions changes an amount of force (e.g., tension or compression) between at least two successive or adjacent vehicles of the vehicle system relative to controlling operation of the vehicle system according to the first set of operating conditions. In one or more embodiments, controlling operation of the vehicle system according to the second set of operating conditions changes a distance between at least two successive or adjacent vehicles relative to controlling operation of the vehicle system according to the first set of operating conditions.

In one or more embodiments, it may be determined that two or more propulsion-generating vehicles may need to contribute revised amounts of effort compared to the predetermined amounts of effort of each vehicle, respectively. As one example, a first vehicle may contribute a first amount of revised effort, and a second vehicle may contribute a second amount of revised effort while the first and second vehicles are controlled to operate according to the second set of operating conditions. The first and second revised amounts may be substantially the same amounts of effort, may be different amounts of effort, may be different types of effort (e.g., braking effort and/or tractive effort), or the like.

The vehicle system may automatically be controlled to operate according to the second set of operating conditions while the vehicle system moves between the first waypoint location and a second waypoint location 412 (shown in FIG. 11). Responsive to reaching, or being within a determined threshold distance away from the second waypoint location, new revised amounts of effort for the two or more propulsion-generating vehicles may again be determined based at least on current conditions of the route at or within a distance range of the second waypoint location. The new revised amount of effort (corresponding to the second waypoint location) may be compared with the predetermined amount of effort that the vehicle system received before the vehicle system started moving along the route to determine how the vehicle system should be operated (e.g., according to the first set of operating conditions based on the predetermined amount of effort, or according to a third set of operating conditions based on the new revised amount of effort corresponding to the second waypoint location).

Figure 12:
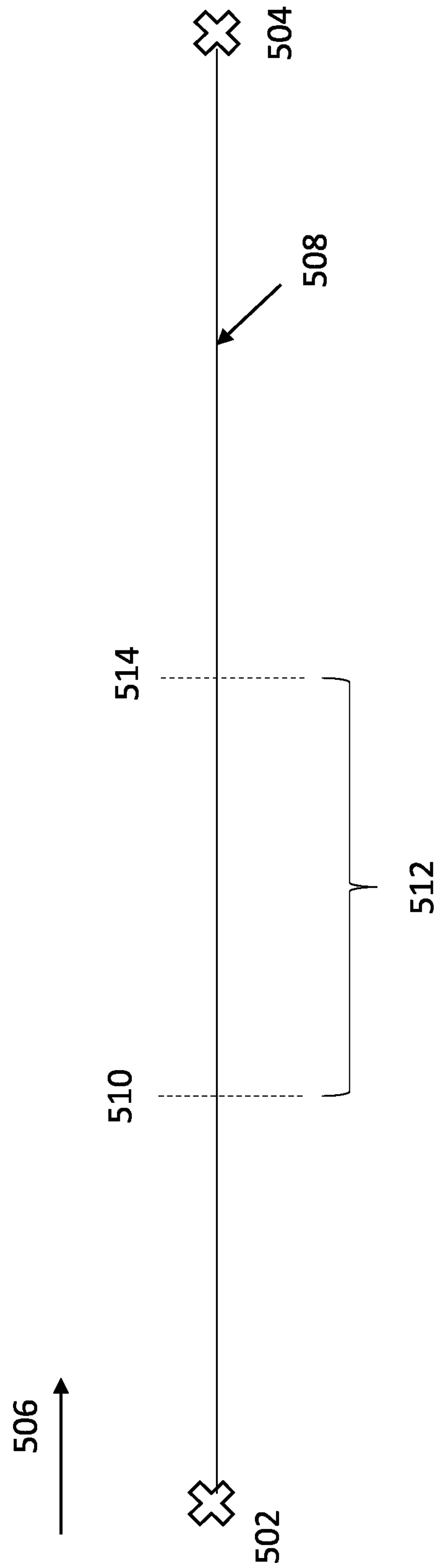
FIG. 12 illustrates a schematic of another example for determining efforts by propulsion-generating vehicles to contribute for controlling operation of a vehicle system moving along a route.

In the illustrated embodiment of FIG. 11, the revised amount of effort is determined based at least in part on current conditions of the route along which the vehicle system is moving. Alternatively, the revised amount of effort may be determined based on upcoming conditions of the route. For example, FIG. 12 illustrates a schematic of another example for determining the revised amount of effort and for controlling operation of the vehicle system. Like the schematic shown in FIG. 11, FIG. 12 includes a route 508 that extends between a start location 502 and an end location 504. A multi-vehicle system (e.g., the vehicle system shown in FIG. 8) moves along the route in a direction of movement 506 from the start location to the end location.

Before the vehicle system starts the trip or starts moving away from the start location, the vehicle system may receive and/or generate the first set of operating conditions indicative of how the vehicle system should be controlled at the one or more locations along the route between the start and end locations. Responsive to the vehicle system reaching, or being within a determined threshold distance from a first waypoint location 510, one or more controllers of the vehicle system may determine that the predetermined amount of effort being contributed by at least one propulsion-generating vehicle is insufficient, and may determine a revised amount of effort that at least one propulsion-generating vehicle should contribute to propel the vehicle system. The revised amount of effort may be determined based at least in part on conditions of the route within a threshold distance 512 ahead of the first waypoint location. For example, the one or more controllers may look at conditions of the route within the upcoming threshold distance, and may compare the conditions of the route with anticipated conditions that were used to determine the predetermined amounts of efforts.

In the illustrated embodiment, the threshold distance extends between the first waypoint location and a second waypoint location 514. In one embodiment, the threshold distance may be based on a length of the vehicle system, such as a percentage of the length of the vehicle system, the threshold distance may be substantially the same as the length of the vehicle system, or the like. Optionally, the threshold distance may be based on a geospatial or governmental divide (e.g., a city limit line, a county line, a state line, a country border, or the like). Optionally, the threshold distance may be based on changes to the route (e.g., the threshold distance may extend to an entrance of a tunnel, may extend to an entrance of a bridge, or the like).

The controller may determine the revised amount of effort by looking at conditions of the route within the threshold distance ahead of the vehicle system in the direction of movement of the vehicle system. Additionally, the controller may compare the different predetermined amounts of effort of vehicles the vehicle system with the determined revised amounts of effort to determine whether the predetermined amount of effort for at least one propulsion-generating vehicle needs to change. The revised amount of effort may be associated with different operating conditions (e.g., a second set of operating conditions) of the vehicle system relative to the first set of operating conditions (e.g., associated with the predetermined amounts of effort).

If it is determined that one or more vehicles needs to contribute the revised amount of effort, the controllers may automatically change from controlling the vehicle system according to the first set of operating conditions to automatically controlling operation of the vehicle system according to the second set of operating conditions. At least one propulsion-generating vehicle may contribute a revised amount of effort while the vehicle system operates according to the second set of operating conditions.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based at least in part on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based at least in part on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based at least in part on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In accordance with one aspect or example, a method may include controlling operation of a vehicle system according to a first set of operating conditions while the vehicle system is moving along a route. The vehicle system may include plural vehicles that may move together along the route. Two or more vehicles of the vehicle system may each contribute a predetermined amount of effort to propel the vehicle system to move along the route based on the first set of operating conditions. The effort being tractive effort and/or braking effort. Responsive to determining a revised amount of effort that at least one of the two or more vehicles of the vehicle system needs to contribute to propel the vehicle system to control one or more performance variables of the vehicle system, control of the vehicle system may be changed from being controlled according to the first set of operating conditions to automatically controlling operation of the vehicle system according to a second set of operating conditions. The at least one vehicle may contribute the revised amount of effort while the vehicle system operates according to the second set of operating conditions.

Optionally, a first vehicle of the two or more vehicles may contribute a first amount of the predetermined effort while the first vehicle operates according to the first set of operating conditions, and the first vehicle may contribute a second amount of revised effort that is different than the first amount of the predetermined effort while the first vehicle operates according to the second set of operating conditions. Optionally, a first vehicle of the two or more vehicles may contribute a first amount of the revised effort and a second vehicle of the two or more vehicles may contribute a second amount of the revised effort that is different than the first amount of the revised effort contributed by the first vehicle while the first and second vehicles operate according to the second set of operating conditions. Optionally, the first set of operating conditions including the predetermined amount of effort may be generated or received before the vehicle system starts moving along the route. Optionally, the revised amount of effort for each of the two or more vehicles may be determined while the vehicle system is moving along the route. Optionally, the first set of operating conditions may include the predetermined effort for plural locations along the route. Optionally, the revised effort may be determined at one or more of the plural locations along the route.

Optionally, the predetermined amount of effort may be compared with the determined revised amount of effort for each of the two or more vehicles at each of the plural locations. A determination may be made that the predetermined effort needs to change based on the comparison between the predetermined amount of effort and the determined revised amount of effort. Optionally, the revised amount of effort may be determined based on one or more of a current speed of movement of the vehicle system, environmental conditions in which the vehicle system is moving, route grades, route curvatures, a total amount of effort from the plural vehicles of the vehicle system, or a state of charge of one or more vehicles of the vehicle system. Optionally, the revised amount of effort may be determined based at least in part on conditions of the route within a threshold distance ahead of the vehicle system along the route in a direction of travel of the vehicle system. Optionally, the revised amount of effort may be determined based at least in part on current conditions of the route along which the vehicle system is moving. Optionally, controlling operation of the vehicle system according to the second set of operating conditions may change an amount of force between at least two successive vehicles of the vehicle system relative to controlling operation of the vehicle system according to the first set of operating conditions. Optionally, controlling operation of the vehicle system according to the second set of operating conditions may change a distance between at least two successive vehicles of the vehicle system relative to controlling operation of the vehicle system according to the first set of operating conditions.

In accordance with one aspect or example, a control system may include one or more processors that control operation of a vehicle system according to a first set of operating conditions while the vehicle system is moving along a route. Two or more vehicles of the vehicle system may each contribute a predetermined amount of effort to control movement of the vehicle system to move along the route based on the first set of operating conditions. The effort may be tractive effort and/or braking effort. The processors may determine a revised amount of effort that each of the two or more vehicles of the vehicle system needs to contribute to propel the vehicle system and to control one or more performance variables of the plural vehicles. Responsive to a determination of a revised amount of effort that at least one of the two or more vehicles of the vehicle system needs to contribute to propel the vehicle system to control one or more performance variables of the plural vehicles, the one or more processors may change from controlling the vehicle system according to the first set of operating conditions to automatically controlling operation of the vehicle system according to a second set of operating conditions. At least one of the two or more vehicles may contribute the revised amount of effort while the vehicle system operates according to the second set of operating conditions.

Optionally, the processors may one or more of generate or receive the first set of operating conditions including the predetermined amount of effort before the vehicle system starts moving along the route. Optionally, the processors may determine the revised amount of effort while the vehicle system is moving along the route. Optionally, the first set of operating conditions may include the predetermined effort for plural locations along the route. The processors can determine the revised effort at one or more of the plural locations along the route. The processors may compare the predetermined amount of effort with the determined revised effort at each of the plural locations. The processors may determine that the predetermined effort needs to change based on the comparison between the predetermined effort and the determined revised effort.

The revised amount of effort may be determined based on one or more of a current speed of movement of the vehicle system, environmental conditions in which the vehicle system is moving, route grades, or route curvatures. The revised amount of effort may be determined based at least in part on conditions of the route within a predetermined threshold distance ahead of the vehicle system along the route in a direction of travel of the vehicle system. Optionally, the revised amount of effort may be determined based at least in part on current conditions of the route along which the vehicle system is moving. Optionally, controlling operation of the vehicle system according to the second set of operating conditions may change an amount of force between at least two successive vehicles of the vehicle system relative to controlling operation of the vehicle system according to the first set of operating conditions. Optionally, controlling operation of the vehicle system according to the second set of operating conditions may change a distance between at least two successive vehicles of the vehicle system relative to controlling operation of the vehicle system according to the first set of operating conditions. Optionally, the one or more performance variables may include forces between adjacent vehicles of the vehicle system, forces on coupling features between adjacent vehicles, states of the coupling features between adjacent vehicles, or a state of charge of an energy storage device of the vehicle system.

In accordance with one aspect or example, a method may include one or more of generating or receiving a first set of operating conditions for controlling operation of a vehicle system according to the first set of operating conditions before the vehicle system starts moving along a route. The vehicle system may include plural vehicles. The first set of operating conditions specifying a predetermined amount of effort that each of two or more vehicles of the vehicle system is to contribute to propel the vehicle system to move along the route. A revised amount of effort that one or more vehicles of the vehicle system needs to contribute to propel the vehicle system may be determined to control one or more performance variables of the plural vehicles while the vehicle system is moving along the route. Control of the vehicle system may change from controlling the vehicle system according to the first set of operating conditions to automatically controlling operation of the vehicle system according to a second set of operating conditions.

One or more embodiments of the inventive subject matter described herein provide systems and methods that control a vehicle system or vehicle group during a trip. For example, one or more embodiments describe a vehicle control system and method for predicting potential needs for engine deration in a particular section of a trip, such as in a particular geographic area, a segment of a route to be traveled on during the trip, etc. The predicted need for engine deration can be taken into account to control the movement of the vehicle system as the vehicle system travels through the particular section of the trip. For example, the vehicle system may be controlled to reduce a likelihood of experiencing a need for deration through that section of the trip, to reduce the number of times that an engine may need to be derated, and/or to prevent deration of an engine.

In one embodiment, engine deration can be the intentional or purposeful reduction in power output or performance of an engine due to various factors, such as environmental conditions, operational limitations, or system malfunctions. The power output or performance can be the horsepower or torque generated by the engine, and can be reduced by reducing a throttle setting of the engine. Engine deration can be used to protect the engine from damage and/or to ensure safe operation of the engine under adverse conditions. A need for derating an engine may occur in situations where the performance of the engine could be compromised, degraded, or decreased. These situations may include operation of the engine in elevated ambient temperatures, operation of the engine in areas with decreased availability of oxygen, malfunction of an engine component, decreased fuel quality, or the like.

Elevated ambient temperatures can occur when the temperature of the air surrounding the vehicle system is warmer than a threshold temperature, such as the temperature of standard room temperature conditions (also known as standard ambient temperature and pressure (SATP)). These conditions can include a temperature of twenty-five degrees Celsius or seventy-seven degrees Fahrenheit, an air pressure of one atmosphere or 101.325 kilopascals, and a relative humidity of 50%. Engines may generate more heat in warmer environments with excessive heat potentially leading to overheating and damage to the engine. To prevent this, the engine may be derated to reduce power output and operating temperature while operating in elevated ambient temperatures. An engine may be derated more for warmer ambient temperatures, and derated less for ambient temperatures that are warmer than the temperature threshold, but still exceed the temperature threshold.

The engine can operate in areas with decreased oxygen relative to other areas. These areas with decreased oxygen can include higher elevations (above a threshold elevation or altitude) and tunnels. At higher altitudes or in tunnels, the air density may decrease or there may be less oxygen, thereby resulting in reduced oxygen availability. Since engines require oxygen for combustion, the engines can produce less power in areas with decreased oxygen. Derating the engine can compensate for the reduced oxygen availability and maintain optimal or improved performance of the engine (compared with operation of the same engine without derating the engine in the same area).

The engine may need to be derated due to malfunction or failure of one or more components of the engine. For example, malfunction of a fuel injector, turbocharger or supercharger, and/or cooling system may result in the need to derate the engine to prevent further damage or malfunction of the engine until the component is fixed or replaced.

The engine may be designed to operate with specific types and/or amounts of fuel. If the fuel quality is poor or different from the intended type, or if the engine operates with less than a minimum amount of fuel, the fuel can degrade engine performance and/or damage components of the engine or associated with operation of the engine (e.g., pistons, fuel injectors, spark plugs, etc.).

Operation of the vehicle system according to manual control and/or a trip plan can result in a need to derate the engine(s) of the vehicle system in one or more locations and/or during movement of the vehicle system through one or more segments of a trip (where the locations or segments are individual, geographic coordinates or areas that encompass less than all the total length of the trip). For example, control of the vehicle system under the manual control and/or according to the designated settings of the trip plan can result in the vehicle system moving through and operating in areas with elevated ambient temperatures (e.g., temperatures warmer than the threshold temperature), the vehicle system moving through and operating in areas with decreased oxygen (e.g., oxygen below a designated oxygen content threshold), the vehicle system moving and operating with less than a threshold amount of fuel, etc. As described above, one or more of these conditions may cause a need to derate the engine to avoid damaging the engine and/or components of the engine.

The trip plans described herein can list or otherwise associate different throttle settings, brake settings, speeds, accelerations, and/or decelerations with different locations, times, and/or distances along a route. For example, a trip plan may designate a throttle setting of one out of a maximum throttle setting of eight while the vehicle system is moving from milepost one to milepost ten, a throttle setting of five while the vehicle system is moving from milepost ten to milepost fifteen, a throttle setting of three while the vehicle system is moving from milepost ten to milepost twenty, and so on. The same may be done for brake settings, speeds, accelerations, and/or decelerations. For example, a trip plan may designate a brake setting of negative one (out of a maximum brake setting of negative eight) when the vehicle system reaches milepost thirty-five, a brake setting of negative three when the vehicle system reaches milepost forty, a brake setting of negative two when the vehicle system reaches milepost fifty-two, and so on. A trip plan may designate a speed of fifteen miles per hour while the vehicle system moves from milepost three to milepost twenty-seven, a speed of forty miles per hour while the vehicle system moves from milepost twenty-seven to milepost fifty, a speed of twenty miles per hour while the vehicle system moves from milepost fifty to milepost sixty-three, and so on. A trip plan may designate a combination of different settings at different locations, times, and/or distances. For example, a trip plan can designate a throttle setting of two from milepost one to milepost three, a throttle setting of five from milepost three to milepost ten, a brake setting of negative two at milepost ten, a throttle setting of seven from milepost ten to milepost twenty, a brake setting of negative three at milepost twenty, a brake setting of negative five at milepost twenty-one, and a brake setting of negative eight at milepost twenty-three. The trip plan can be implemented by the vehicle controller sending control signals to the engine, the brakes, etc. to cause the engine and/or brakes to operate according to the operational settings designated by the trip plan. For example, the vehicle controller can send a signal to an engine control unit before reaching or when the vehicle system reaches milepost one to direct the engine to operate at a throttle setting of two. Then, the vehicle controller can send a signal to an engine control unit before reaching or when the vehicle system reaches milepost three to direct the engine to operate at a throttle setting of five. Then, the vehicle controller can send a signal to a brake controller (e.g., a device that controls air brakes of the vehicle system, an electronically controlled pneumatic device of a brake system, friction brakes, etc.) to set the brakes to a setting of negative two at milepost ten. Then, the vehicle controller can send a signal to an engine control unit before reaching or when the vehicle system reaches milepost ten to direct the engine to operate at a throttle setting of seven. Then, the vehicle controller can send a signal to the brake controller before reaching or when the vehicle system reaches milepost twenty to set the brakes to a setting of negative three. Then, the vehicle controller can send a signal to the brake controller before reaching or when the vehicle system reaches milepost twenty-three to set the brakes to a setting of negative eight. Optionally, the trip plan may be used to inform or instruct an operator how to manually control the throttle settings, brake settings, etc. For example, the different operational settings of the trip plan may be presented (e.g., visually displayed on a display, audibly presented via a speaker, etc.) to the operator at the appropriate times or locations so that the operator manually changes the settings of the engine and/or brakes to match the operational settings of the trip plan.

The trip plan can be created and stored in a memory, such as a computer hard drive, a removable disk, a server, random access memory (RAM) of a computer system, read-only memory of the computer system, flash memory, cache memory of the computer system, virtual memory or another portion of the hard drive, a magnetic disk, optical storage (e.g., compact discs, digital versatile discs, blu-ray discs, etc.), magnetic RAM, a magnetic tape, or the like. This can be referred to as a first trip plan, an existing trip plan, a previous trip plan, or a previously created trip plan. This trip plan can then be modified or changed, with the modified or changed trip plan referred to as a revised trip plan, a modified trip plan, a changed trip plan, or a different trip plan. For example, the throttle setting for milepost or mile marker one hundred twenty seven in the first trip plan can be a notch setting of three, the brake setting for milepost or mile marker one hundred forty in the first trip plan can be a brake setting of negative four. This trip plan can be modified into a different trip plan with the throttle setting for milepost or mile marker one hundred twenty seven in the different trip plan being a notch setting of four, the brake setting for milepost or mile marker one hundred forty in the different trip plan being a brake setting of negative six. Other throttle settings and brake settings in the first trip plan may be the same as the throttle settings and the brake settings in the different trip plan. Optionally, additional throttle settings and/or brake settings may differ for the same locations between the first trip plan and the different trip plan.

Creating or modifying trip plans as described herein can avoid or reduce a need to decrease the total motive power output produced by a vehicle group. For example, while the power output from one or more engines may be decreased to avoid damaging the engines, the power output lost by this decrease can be supplanted by other engines increasing power output and/or other sources (e.g., powering the motors that produce the motive power with onboard energy storage devices and/or off-board energy sources). The motive power output can be the tractive effort generated by motors that rotate axles and/or wheels of the vehicle system.

Reducing the need for derating an engine can mean that the vehicle system is controlled to avoid situations where the need for deration can occur. For example, the vehicle system can be controlled to avoid the areas with elevated temperatures, to avoid the areas with decreased oxygen, to have more than the threshold amount of fuel, etc. This can happen by modifying the trip plan that was previously created. Control of the vehicle system according to the modified or changed trip plan can cause the vehicle system to experience fewer deration events during the trip when controlled according to the modified trip plan that is created or modified according to the methods and control systems described herein. There may be fewer deration events when compared to control of the vehicle system according to the prior trip plan. Therefore, the vehicle system controlled according to the methods and control systems described herein may not experience any deration events during the trip or may experience a non-zero number of deration events that is fewer than the number of deration events that the vehicle system would experience when not controlled by the methods and systems described herein.

The vehicle system may be controlled to reduce the likelihood or number of deration events, while still achieving one or more goals of a trip. These goals can include, for example, reaching a destination location or one or more intermediate locations between a starting location and the destination location of the trip within a threshold period of time, consuming less than a designated threshold amount of fuel or electric energy, producing fewer than a threshold level or amount of emissions, generating less than a threshold level or amount of audible noise, etc. This can involve, for example, changing a trip plan so that the vehicle system travels on another route that has or extends through cooler ambient temperatures, the vehicle system travels on another route that has or extends through areas with greater concentrations of oxygen, the vehicle system travels faster or on shorter routes to consume less fuel, or the like.

As one example, a first trip plan can direct the vehicle system to travel through an airflow restricted area or volume having less air or oxygen than outside of the area or volume, or less than a designated threshold (e.g., a tunnel or an elevated location). This trip plan may require the vehicle system to operate with an engine in a first vehicle in the vehicle system operating at a first throttle setting, an engine in a second vehicle in the same vehicle system operating at the first throttle setting, an engine in a third vehicle in the same vehicle system operating at a lower, second throttle setting, an engine in a fourth vehicle in the same vehicle system operating at a lower, third throttle setting, and so on, during travel through the airflow restricted area. But due to elevated temperatures in the airflow restricted area and/or the reduced oxygen level in the airflow restricted area, one or more of the engines may need to be derated during travel within the airflow restricted area to avoid damaging the engine(s).

The system and method described herein can modify this first trip plan into a second trip plan that has different operational settings for one or more of the engines to avoid the need to derate the engine(s) and avoid damage to the engine(s). For example, the second trip plan may command or dictate that the engines in the first and second vehicles use lower throttle settings (lower than the settings dictated by the first trip plan, such as the second or third throttle setting) while moving in the airflow restricted area but may also command or dictate that the engines in the third and fourth vehicles use higher throttle settings (higher than the settings dictated by the first trip plan, such as the first throttle setting).

The second trip plan also may command or dictate that the engines in the first and second vehicles use higher throttle settings (higher than the settings dictated by the first trip plan, or even higher than the first throttle setting) upon exiting from the airflow restricted area while also commanding or dictating that the engines in the third and fourth vehicles use lower throttle settings (lower than the settings dictated by the first trip plan, such as the second or third throttle setting), while those engines are operating within the airflow restricted area. This change to the first trip plan can result in the vehicle system moving through the airflow restricted area without having to derate any engine, yet also cause the vehicle system to travel sufficiently fast to reach a destination location no later than a designated goal (of the first trip plan).

The first trip plan described above may be modified into the second trip plan that increases (relative to the first trip plan) the throttle settings of the engines in the first, second, third, and/or fourth vehicles during travel leading up to the airflow restricted area, then decreases (relative to the first trip plan) the throttle settings of these engines during travel within the airflow restricted area. This can result in the vehicle system approaching the airflow restricted area faster and with more momentum, which can carry or move the vehicle system through the airflow restricted area faster and without having to derate the engines than if the settings of the first trip plan were used. This change to the first trip plan can result in the vehicle system moving through the airflow restricted area without having to derate any engine, yet also cause the vehicle system to travel sufficiently fast to reach a destination location no later than a designated goal (of the first trip plan).

As another example, the first trip plan described above may be modified into a third trip plan that increases (relative to the first trip plan) the throttle settings of the engines in the first, second, third, and/or fourth vehicles during travel leading up to the airflow restricted area, then decreases (relative to the first trip plan) the throttle settings of these engines during travel within the airflow restricted area. This can result in the vehicle system approaching the airflow restricted area faster and with more momentum, which can carry or move the vehicle system through the airflow restricted area faster and without having to derate the engines than if the settings of the first trip plan were used. This change to the first trip plan can result in the vehicle system moving through the airflow restricted area without having to derate any engine, yet also cause the vehicle system to travel sufficiently fast to reach a destination location no later than a designated goal (of the first trip plan).

As another example, the first trip plan described above may direct motors that rotate axles and/or wheels of the vehicles in the vehicle system to be powered by electric energy obtained from generators or alternators that are powered by the engines, and not onboard energy storage devices, such as batteries, fuel cells, or supercapacitors, and/or off-board energy sources, such as catenaries or electrified rails. The first trip plan can be changed into a fourth trip plan that directs the motors to be powered instead by the onboard energy storage devices and/or the off-board energy sources during travel through the airflow restricted area. This can avoid the need for deration to avoid damaging the engines during travel through this area.

With respect to energy sources that can provide electric energy (e.g., direct and/or alternating current) to one or more loads, the energy sources may include one or more fuel cells. Suitable fuel cells may include a solid oxide fuel cell (SOFC), a proton exchange membrane (PEM) fuel cell, an alkaline fuel cell, direct methanol, fuel cell, molten carbonate fuel cell, and an acid fuel cell. Suitable acid fuel cells may include solid acid and phosphoric acid fuel cells. Examples of suitable fuel cell electrodes may include a catalyst containing platinum and ruthenium; or a catalyst containing titanium tungsten oxide nanoparticles that are coated with a layer of platinum. A suitable polymer membrane may be Nafion, which is commercially available from Du Pont, or expanded porous polytetrafluoroethylene (ePTFE).

The deration events may be avoided (or the need for the deration events may be reduced) by modifying a distribution of designated power outputs provided by multiple propulsion-generating vehicles in the vehicle system, by reducing the designated power output to be provided by one or more propulsion-generating vehicles relative to a planned power output to be provided by the propulsion-generating vehicles, by changing the number and/or type of propulsion-generating vehicles in the vehicle system, by increasing the electric energy (e.g., voltage) supplied by energy storage devices (e.g., batteries, fuel cells, supercapacitors, etc.) to motors of the vehicle system, by decreasing the load or demand on an engine during travel of the vehicle system through an area associated with prior deration events, by changing the time of the day or time of the year that the vehicle system moves through an area associated with prior deration events, by changing the route(s) traveled by the vehicle system to avoid or reduce travel through areas associated with prior deration events, or the like. The predicted potential engine deration may be considered in the generation or selection of a trip plan that designates operational settings (e.g., throttle settings, brake settings, speeds, accelerations, decelerations, etc.) for controlling the movement of the vehicle system during the trip.

While at least one embodiment of the system and method described herein relates to changing one trip plan (where a need for deration is determined to exist) into another trip plan (where fewer needs for deration or no needs for deration are determined to exist), at least one embodiment involves creating a trip plan where none existed before. For example, a trip plan may be created to direct or dictate control of the vehicle system to reduce or eliminate the need for deration compared to manual control of the vehicle system. The needs for deration or likelihood for deration may be identified or determined based on prior trips of the same or another vehicle system. Operation of the engine(s) of a vehicle system may be monitored during a trip over a route to determine whether deration was required and implemented. During a planned subsequent trip over the same route (or at least a segment of this same route), the prior deration events or needs for deration for the same or another vehicle system may be identified, and the trip plan for the planned subsequent trip may be created or modified to avoid the deration events during the planned, subsequent trip. Optionally, the needs for deration or likelihood for deration may be identified or determined based a computer simulation of an upcoming trip of a vehicle system. Operation of the engine(s) of a vehicle system may be simulated to determine whether deration would be required. The trip plan may be created or modified to avoid the deration events during the upcoming trip. As a result, the vehicle system traveling along a route during the trip according to the trip plan may have a reduced likelihood of experiencing deration relative to movement of the vehicle system according to manual control and/or a trip plan that does not account for potential engine deration at particular sections of the trip. Furthermore, since the trip plan accounts for potential engine deration, the trip plan may more accurately match the actual movement of the vehicle system during the trip relative to a trip plan that does not account for variations in engine performance due to deration.

In another example, one or more embodiments describe a system and method for determining a power output capability range that the vehicle system is capable of providing at different particular sections of the trip, such as particular geographic areas along the route. The determined power output capability range accounts for deration, and is more accurate than assuming that an engine is able to provide uniform power output at the rated horsepower of the engine along each of the various sections of the trip. For example, upcoming needs for deration to avoid engine damage may be identified, and the reduced engine output may be known (e.g., the horsepower generated by each engine at different throttle settings may be designated, known, or previously assigned default values, and the upcoming needs for deration may be associated with the reduced throttle settings and, therefore, the reduced horsepower may be determined).

The determined power output capability range may be based on environmental conditions experienced by the vehicle system in the particular section of the trip and vehicle characteristics, as described above (when accounting for the needed deration of the engine(s)). The determined power output capability range may be used to control movement of the vehicle system during the trip, such that the vehicle system is controlled to not derate engine(s), to derate the engines to a lesser extent, or to supplant or augment the engine output with power from another source (e.g., powering motors with electric energy from another source, as described above). As a result, the engines are less likely to experience a need for deration in which the engines are not capable of providing a requested power output and provide a reduced power output less than the requested power output. While one or more engines may be derated by decreasing the power output from those engines, other engines may not be derated (as described herein) and the total power output from all engines may not be derated. This may occur by supplanting the reduced power output from one engine with increased power from other engines. This can ensure that the total power output from all engines is not decreased.

The determined power output capability range may be used in the generation or selection of a trip plan that designates operational settings for controlling the movement of the vehicle system during the trip. The trip plan may be generated or selected using the determined power output capability ranges for different sections of the trip as constraints, such that the throttle settings designated by the trip plan for a particular section of the trip do not cause the actual power output provided by an engine to exceed the power output capability range for that particular section of the trip. When compared to trip plans that do not account for variations in engine capability due to deration, the trip plan based on the determined power output capability ranges may more accurately match the actual movement of the vehicle system during the trip, resulting in improved vehicle system handling and reduced reliance on manual input.

The systems and method described herein can be used for controlling various types of vehicle systems, such as trains, automobiles (e.g., autonomous cars and trucks), off-highway vehicles, marine vessels, and the like. Each vehicle system that is controlled by the systems and methods described herein may include only a single vehicle or multiple vehicles. In the vehicle systems with multiple vehicles, the vehicles may be mechanically and/or logically coupled together to move together along a route.

Figure 13:
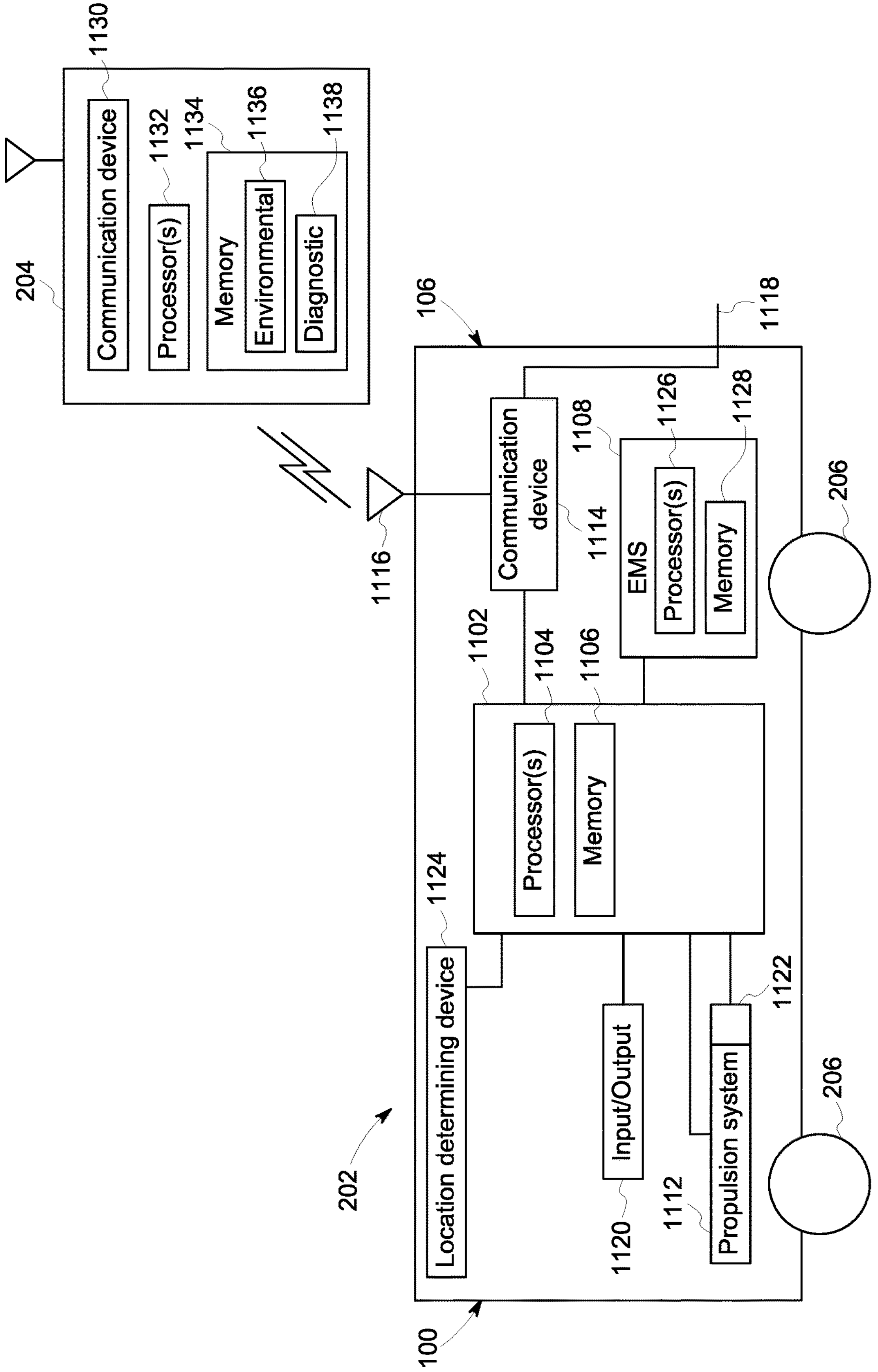
FIG. 13 is a schematic diagram of one embodiment of a vehicle control system for controlling movement of a vehicle system during a trip.

FIG. 13 is a schematic diagram of one embodiment of a vehicle control system 202 for controlling movement of a vehicle system 100 during a trip. The vehicle system 100 in the illustrated embodiment includes a propulsion-generating vehicle 106. The propulsion-generating vehicle can generate propulsive force to propel the vehicle system along a route. The propulsion-generating vehicle 106 may represent a locomotive, an off-highway vehicle (e.g., a vehicle not designed for or permitted to travel on public roadways), automobiles (e.g., cars and trucks that are designed for traveling on public roadways), marine vessels, or the like. The propulsion-generating vehicle may represent the entire vehicle system, or alternatively may represent one vehicle of multiple vehicles of the vehicle system.

The vehicle control system is at least partially disposed on the propulsion-generating vehicle. For example, as described herein, the vehicle control system may be entirely disposed onboard the vehicle system, or at least a portion of the vehicle control system may be located off-board the vehicle system, such as at a dispatch facility 204, a wayside device, or another vehicle system. A portion of the vehicle control system may be disposed onboard the propulsion-generating vehicle and another portion may be disposed onboard another propulsion-generating vehicle or a non-propulsion-generating vehicle of the same vehicle system (e.g., a trailer, rail car, or other vehicle that does not have or carry components for propelling the vehicle). The vehicle control system can control operations of the vehicle system along the route during a trip. For example, the vehicle control system may control movement of the vehicle system to account for variations in engine capability of the vehicle system at particular sections of the trip, such as to provide more accurate control of the vehicle system and/or to avoid experiencing deration events or the need to derate the engine(s) of the vehicle system.

An engine experiencing a deration event can have a reduced power output capability relative to the rated power output of the engine. The deration can be needed due to various factors described above, such as a limited amount of oxygen available for combustion, high engine temperatures, poor fuel quality, poor engine health or other conditions of the engine, and the like. The oxygen concentration in the air may be limited due to, for example, a low ambient air pressure resulting from a relatively high altitude or elevation and/or poor air quality caused by a high concentration of exhaust gases in the air. The high engine temperatures may be caused by a relatively high ambient air temperature and/or a reduced ability to dissipate heat from the engine. During a deration event, the throttle setting of the engine may be reduced such that the engine is only producing a fraction of the rated power output (also referred to as horsepower), such as 60%, 75%, or 90% of the rated power output. Engine deration may be undesirable due to the reduced control of the vehicle system and the reduced performance capability of the vehicle system.

The propulsion-generating vehicle includes a propulsion system 1112, which includes one or more engines that consume fuel and oxygen to generate power for propelling the vehicle system along a route, such as a track, a road, a waterway, an off-road path, or the like. For example, the one or more engines may combust fuel and oxygen to drive a piston in a cylinder, to rotate a shaft, or the like to generate a propulsive force. Additionally, or alternatively, the engines may combust fuel and oxygen to generate electric current to power one or more traction motors, which generate the propulsive force. The propulsive force is used to rotate axles and wheels 206 of the vehicle system to move the vehicle system along the route. The propulsion system can provide both tractive effort to propel the vehicle system and braking effort to slow and/or stop the vehicle system. For example, in addition to the one or more internal combustion engines and traction motors, the propulsion system may include one or more brakes, batteries, generators, alternators, cooling systems (e.g., radiators, fans, etc.), and the like. The propulsion system may also include electric components that power the traction motors using electric energy obtained from an onboard storage device (e.g., batteries) and/or an off-board source (e.g., a catenary and/or electrified rail), such as transformers, converters, inverters, and the like. The propulsion-generating vehicle optionally may have a hybrid propulsion system that includes motors powered by both fuel-consuming engines and an onboard or off-board source of electric current.

One or more propulsion sensors 1122 may be operatively connected with the propulsion system to obtain data representative of operational parameters of the propulsion system. For example, the sensors may include one or more of an oxygen sensor that measures the fuel-to-oxygen ratio within the engine, a mass air flow sensor that measures the amount of air flow into the engine, a temperature sensor that measures the temperature of an engine coolant, such as water, a position sensor that measures revolutions per minute of a crankshaft of the engine, a dynamometer that measures torque of the engine to determine the power output (or horsepower) provided by the engine, an electrical voltage sensor that measures an electrical current provided by a generator or alternator of the propulsion system, or other sensors. The vehicle also includes at least one input device and output device, which optionally may be integrated together as a single input/output device 1120. The input device may include a keyboard, pedal, button, lever, microphone, touchscreen, or the like, and the output device may include a speaker, a display screen, a light, or the like. The input/output device may be used by an operator to provide input and/or monitor output of the vehicle and/or the vehicle system during a trip. The input/output device may also be used by an operator to select or modify a trip plan for the vehicle system during the trip, as described in more detail herein.

The vehicle includes an onboard vehicle controller 1102 that controls operations of the vehicle and/or the vehicle system. For example, the vehicle controller may convey control signals to the propulsion system to control the tractive and braking efforts of the propulsion system. In an embodiment in which the vehicle system includes multiple propulsion-generating vehicles (e.g., the embodiment shown in FIG. 2), each of the propulsion-generating vehicles may include a respective vehicle controller. Alternatively, only one of the multiple propulsion-generating vehicles includes the vehicle controller, and that vehicle controller may communicate control signals to the other propulsion-generating vehicles to control the propulsion systems on those vehicles 106.

The vehicle controller 1102 may include one or more processor(s) 1104 and/or other logic-based device(s) that perform operations based on instructions stored on a tangible and non-transitory computer readable storage medium or memory 1106. The controller may additionally or alternatively include one or more hard-wired devices that perform operations based on hard-wired logic of the devices.

The controller may represent the hardware that operates based on software or hardwired instructions, the software that directs hardware to perform the operations, or a combination thereof. In embodiments where the controller includes multiple processors, the processors may all be in the same housing such that the processors are part of a single device, or the processors may be distributed among several different locations such that the processors are in different housings or different devices located in different spaces onboard the same vehicle or different vehicles. The processors may each perform the same operations, or the operations may be distributed among the processors with two or more of the processors performing different operations described herein.

The propulsion-generating vehicle includes a location determining device 1124 that determines a location of the vehicle as the vehicle system travels along the route during a trip. The location determining device may be a global navigation satellite system (GNSS) receiver or sensor, such as a global positioning system (GPS) receiver that obtains location data (e.g., coordinates) representative of the location of the vehicle. The one or more processors of the controller are communicatively coupled, via one or more wired or wireless connections, to the location determining device and analyze the location data to determine the location of the vehicle at various times during a trip. The one or more processors may compare the location data of the vehicle to a map or trip schedule to determine a level of progress of the vehicle system along the route and/or a proximity of the vehicle system to one or more locations of interest, such as a destination.

The propulsion-generating vehicle also includes a communication device 1114. The communication device can communicate with an off-board location, such as another vehicle system, the dispatch facility, another vehicle in the same vehicle system, a wayside device (e.g., transponder), or the like. The communication device can communicate with the off-board location via wired and/or wireless connections (e.g., via radio frequency). The communication device can include a wireless antenna 1116 and associated circuitry and software to communicate wirelessly. For example, the communication device may include a transceiver, or separate receiver and transmitter components. Additionally or alternatively, the communication device may be connected with a wired connection via a cable 1118 to another vehicle in the vehicle system 100. For example, the cable may be a trainline, a multiple unit cable, an electronically-controlled pneumatic brake line, or the like. The communication device can be used to communicate (e.g., broadcast or transmit) a variety of information described herein. For example, the communication device can communicate control signals to other propulsion-generating vehicles 106 of the vehicle system, data representative of operational parameters of the propulsion system that is obtained by the sensors, etc. The communication device can also be used to receive information from an off-board, remote location, such as environmental data, diagnostic data, remote control signals, trip schedules, and/or remotely-generated trip plans.

The propulsion-generating vehicle further includes an energy management system ("EMS" in FIG. 1) 1108 communicatively coupled with the vehicle controller via a wired or wireless connection. The energy management system can generate or create a trip plan and/or select a previously-created trip plan. The trip plan designates operational settings of the vehicle system (e.g., throttle settings, power outputs, speeds, brake settings, and the like) as a function of at least one of location, time elapsed, or distance traveled along the route during a specific trip. A trip plan differs from a trip schedule. For example, the trip schedule may specify the route to travel and at what times the vehicle system is to be at one or more particular locations along the route, such as when to arrive at a destination location. The trip plan, however, may designate operational settings to control how the vehicle system moves along the route. The trip plan is configured to allow the vehicle system to achieve one or more goals, such as arriving by a scheduled arrival time of the schedule, reducing fuel consumption, and/or reducing total travel time to complete a trip, while abiding by designated external constraints. The external constraints may be limits on the amount of fuel consumed, the amount of emissions generated, speed limits, vehicle acceleration capability limits, noise limits, and the like. As an example, the vehicle system traveling along the route from a starting location to a destination location within a designated time according to a trip plan may consume less fuel or produce fewer emissions than the same vehicle system traveling along the same route from the same two locations, but according to another trip plan or according to manual control of the vehicle system. One or more examples of trip plans (also referred to as mission plans or trip profiles) and how the trip plans are determined are provided in U.S. Pat. No. 9,733,625, the entire disclosure of which is incorporated by reference.

The energy management system may represent a hardware and/or software system that operates to perform one or more functions described herein. For example, the energy management system may include one or more processor(s) and/or other logic-based device(s) that perform operations based on instructions stored on a tangible and non-transitory computer readable storage medium or memory 1128. Similar to the controller, the processor(s) of the energy management system may be disposed in a single device housing or may be distributed among multiple device housings, and/or the processors may each perform the same operations or two or more of the processors may perform different operations. The energy management system may additionally or alternatively include one or more hard-wired devices that perform operations based on hard-wired logic of the devices. The energy management system may represent the hardware that operates based on software or hardwired instructions, the software that directs hardware to perform the operations, or a combination thereof.

The energy management system can generate a trip plan, retrieve and select a trip plan stored in the memory (or the memory of the vehicle controller), and/or receive a trip plan from an off-board location via the communication device. The vehicle controller (e.g., the one or more processors of the vehicle controller) can refer to the trip plan to determine the designated throttle settings and/or power outputs to be generated by the one or more propulsion-generating vehicles of the vehicle system during the trip.

The dispatch facility is located off-board and remote from the vehicle system. The dispatch facility includes a communication device 1130 that is able to wirelessly communicate with the vehicle system via the communication device of the vehicle system. The communication device of the dispatch facility may be similar to the vehicle system communication device, such as including an antenna, transceiver, and associated circuitry. In the illustrated embodiment, the dispatch facility includes one or more processors 1132 and a tangible and non-transitory computer readable storage medium or memory 1134. This memory may include various databases, such as an environmental database 1136 and a diagnostic database 1138. The one or more processors of the dispatch facility can access the memory of the dispatch facility and retrieve data from one or more of the environmental database or the diagnostic database. The dispatch facility processors may control the dispatch facility communication device to wirelessly communicate the data to the vehicle system. The dispatch facility processors may also store data received by the dispatch facility communication device into one or both of the databases. The dispatch facility shown in FIG. 13 may represent a processing device that is off-board the vehicle system and able to communicate with the vehicle system to perform the functions described herein.

In an embodiment, the vehicle control system is configured to control the movement of the vehicle system during a trip based on determined power output capability ranges of the engines of the propulsion system at different geographic areas along the route. The power output capability ranges are determined by the vehicle control system by accounting for variations in performance capability (e.g., needs for deration) of the engines as the vehicle system travels through the different geographic areas. For a given geographic area, the power output capability range that is determined may be equal to or less than the rated power output or horsepower of the engine.

Figure 14:
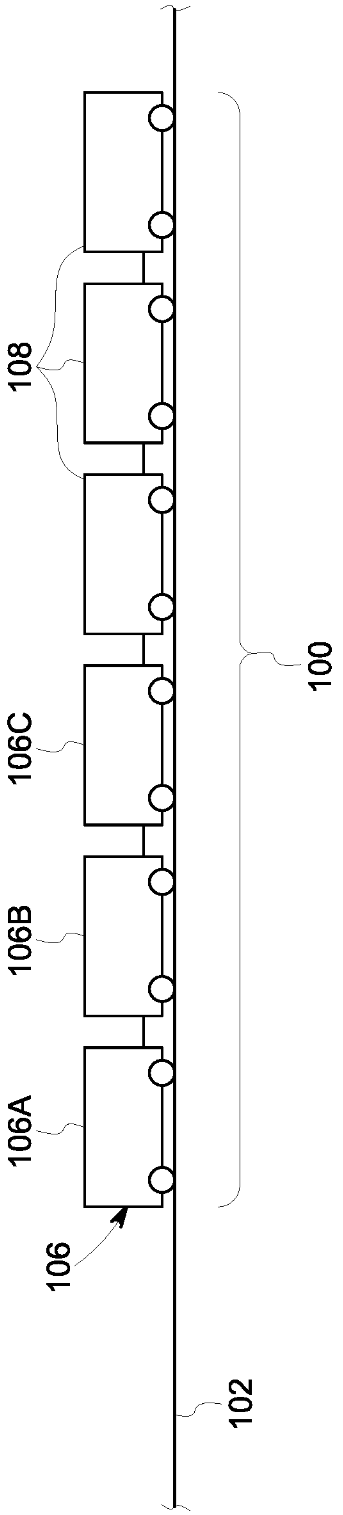
FIG. 14 illustrates a schematic diagram of a vehicle system traveling along a route according to an embodiment.

FIG. 14 illustrates a schematic diagram of the vehicle system traveling along a route 102 according to an embodiment. The vehicle system includes multiple vehicles 106, 108 that travel together along the route. The vehicles can be mechanically connected with each other, such as by couplers, to form a string of vehicles. In an alternative embodiment, the vehicles are not mechanically connected to each other, but rather are logically and operationally connected via a communication network that controls the vehicles to travel together along the route with a designated spacing between adjacent vehicles. The vehicle system in an embodiment may be a train that includes at least one locomotive representing the propulsion-generating vehicle and at least one rail car mechanically coupled to the locomotive. In other embodiments, the vehicle system may be one or more automobiles, such as trucks. For example, the propulsion-generating vehicle may represent a tractor of a tractor trailer truck that pulls one or more passive trailers (which may represent other vehicles of the vehicle system).

The propulsion-generating vehicles in the illustrated embodiment include a lead propulsion-generating vehicle 106A, a trail propulsion-generating vehicle 106C, and an intermediate propulsion-generating vehicle 106B disposed between the lead and trail vehicles. Although the propulsion-generating vehicles are shown as being directly coupled with each other, two or more of the propulsion-generating vehicles may be separated from one another by one or more of the vehicles 108 in an alternative embodiment. The vehicle system can coordinate the operations of the propulsion-generating vehicles as the vehicle system travels along the route during a trip.

The vehicles represent non-propulsion-generating vehicles incapable of generating propulsive force to propel the vehicle system along the route. The non-propulsion-generating vehicles may be used for carrying cargo and/or passengers. The non-propulsion-generating vehicles may be rail cars, trailers, or other vehicle units that are propelled along the route by the propulsion-generating vehicles. The group of propulsion-generating vehicles may represent a vehicle consist. While three propulsion-generating vehicles and three non-propulsion-generating vehicles are shown in the illustrated embodiment, the vehicle system may have different numbers and/or arrangements of the propulsion-generating vehicles and the non-propulsion-generating vehicles in alternative embodiments.

Figure 15:
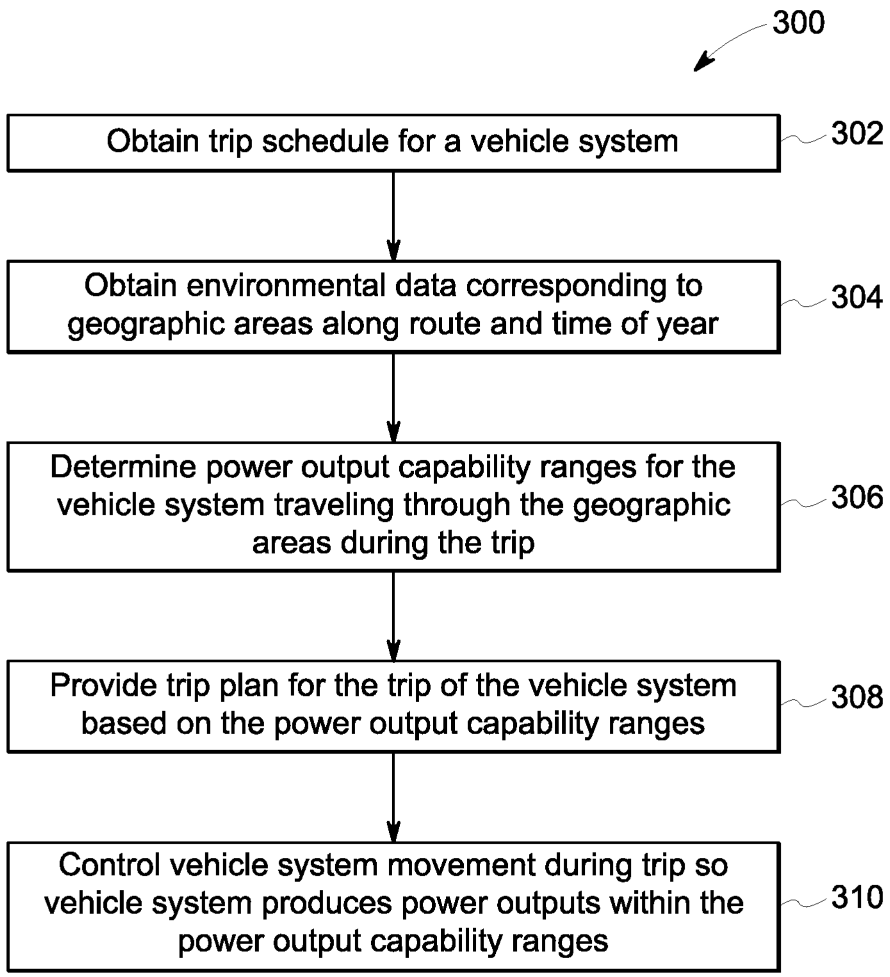
FIG. 15 is a flowchart of one embodiment of a method for controlling a vehicle system along a route during a trip.

FIG. 15 is a flowchart of one embodiment of a method 300 for controlling a vehicle system along a route during a trip. The method is described in connection with the vehicle control system as shown in FIG. 1. For example, in one embodiment the method can be performed in full by the one or more processors of the energy management system. In alternative embodiments, the method can be performed in full or in part by the one or more processors of the vehicle controller and/or the one or more processors of the dispatch facility.

At step 302, a trip schedule is obtained for a scheduled trip of a vehicle system. The trip schedule identifies the route and the date or other time that the trip is to occur. At step 304, environmental data is obtained that corresponds to different geographic areas along the route of the trip and the time of the year in which the trip occurs or is to occur. The environmental data is used to predict the environmental conditions that the vehicle system will experience at various geographic areas along the trip. The trip may cover a relatively long distance, such as up to or exceeding five hundred miles. Due to the long distance of the trip, some geographic areas along the route may have different environmental conditions than other geographic areas along the route, such as a different ambient temperature, a different ambient pressure, a different elevation, a different humidity, and the like. Furthermore, the environmental conditions experienced by the vehicle system on the route are also based on the time of the year. A vehicle system traveling through a particular geographic area along the route may experience a different ambient temperature in July than in January.

Figure 16:
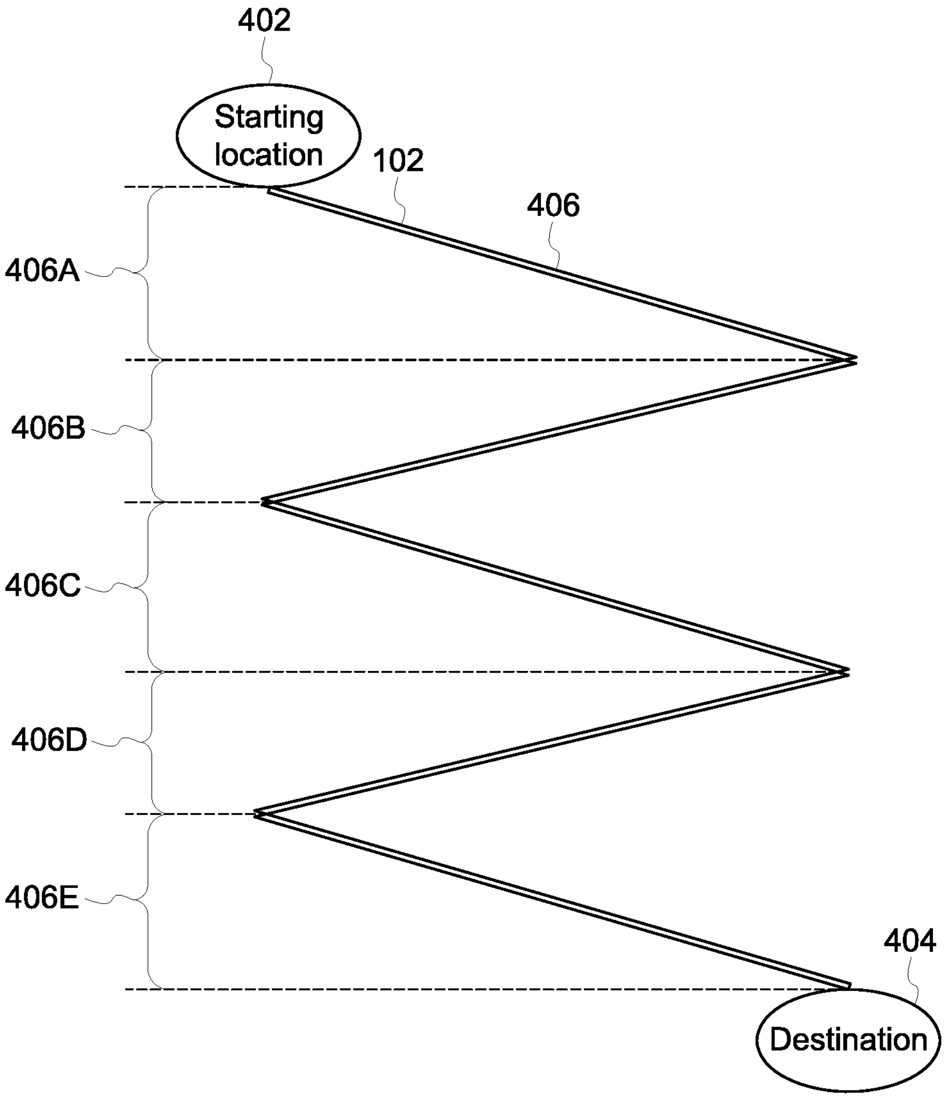
FIG. 16 illustrates a route for a trip of a vehicle system according to an embodiment.

FIG. 16 illustrates a route for a trip of a vehicle system according to an embodiment. The route extends from a starting location 402 to a destination location 404. The distance between the starting location to the destination location along the route may be hundreds of miles, as described above. Due to the long distance of the route, the route can be divided into multiple segments or geographic areas 406. A geographic area may be a two dimensional area or three dimension volume bounded by boundaries that define the area. Space located within or between these boundaries is within the geographic area while space located outside of the boundaries is outside the geographic area. The boundaries of the area may be inside or part of the area or outside of the area in different embodiments. The size (e.g., length along the route) of each geographic area may be miles long, such as ten miles, fifty miles, or one hundred miles. The different geographic areas may or may not have the same size as one another. For example, the locations of the geographic areas may be based, at least in part, on the locations of cities, towns, or even the locations of weather sensors along the route. In the illustrated embodiment, the route includes five geographic areas 406A-E. During the trip, the vehicle system travels from the starting location through the first geographic area 406A, then through the second geographic area 406B and subsequent geographic areas 406C-406E until reaching the destination. Due to the long distance of the route, the vehicle system may experience different environmental conditions, such as different ambient temperatures and pressures, while traveling through the different geographic areas. For example, the route may extend north from Texas to South Dakota, so the temperature in the first geographic area in Texas is likely greater than the temperature in the fifth geographic area in South Dakota.

As described herein, the environmental conditions, such as temperature, pressure, and air constituency, can affect the performance capability of an engine of the vehicle system, and may be a basis for needing to derate the engine to avoid or reduce the likelihood of damage to the engine and/or components of the engine. For example, the vehicle system may not be able to perform as well at hot ambient temperatures over 90° F. than at cool ambient temperatures (e.g., between 30° F. and 60° F.). Air constituency may refer to the make-up of the ambient air through which the vehicle system travels. The air constituency may include oxygen concentration, nitrogen oxide (e.g., NOx) concentration, smoke and particulate matter levels, and the like. The vehicle system may be able to perform better within ambient air that has a greater oxygen concentration than within ambient air with a reduced oxygen concentration.

The route of the vehicle system may include one or more tunnels or other airflow-restricted areas. Such airflow restricted areas may have poor environmental conditions for engine operation. For example, as a vehicle system with multiple propulsion vehicles travels through an airflow restricted area, following vehicles that follow preceding vehicles through the airflow restricted area may experience poorer air constituency levels (e.g., reduced air quality) than the air quality experienced by the preceding vehicles. The oxygen concentration in the air experienced by following vehicles decreases due to the use of oxygen by preceding vehicles for fuel combustion. The concentration of NOx, smoke, and other particulate matter in the air experienced by the following vehicles increases due to the exhaust gases generated by the preceding vehicles. The temperature of the ambient air experienced by the following vehicles increases due to the heat emitted by the preceding vehicles.

Since the environmental conditions affect the performance capability of the engine of the vehicle system, the environmental data is obtained to predict the effect that the environmental conditions will have on the vehicle system during the trip. Referring now back to the method shown in FIG. 15, the environmental data can include historical data based on measured environmental conditions in previous years. The environmental data may include an average temperature, average pressure, average humidity, average air constituency levels (e.g., oxygen concentration, NOx concentration, etc.) and/or the like recorded within the different geographic areas along the route. Optionally, the environmental data may include the geographic locations of tunnels or other known airflow-restricted areas along the route.

The environmental data can be classified based on the time of the year. The environmental data may be divided into monthly, weekly, or biweekly times of the year. For example, for a trip that is to occur in the second week of January, the environmental data that is obtained can correspond to the environmental conditions recorded at the different geographic areas along the route in previous months of January (for monthly), in the first two weeks of the year (for biweekly), or in the second week of the January (for weekly). The environmental data may include an average temperature range and an average pressure range. The average temperature range can include the average low temperature and the average high temperature for the given geographic area during the particular time of the year. Likewise, the average pressure range can include the average low pressure and the average high pressure based on the geographic area and time of the year.

The environmental data may be obtained from a database that stores historical environmental data, such as the environmental database at the dispatch facility. For example, the one or more processors of the energy management system may request the environmental data for the scheduled trip, and subsequently receive the requested environmental data, by using the communication device to communicate with the dispatch facility. Alternatively, the environmental data may be stored locally in the memory of the energy management system.

The environmental data is used to provide spatial markers along the route in a route database. For example, the route database can include information about the route for the trip, including the starting location, the destination location, and/or the beginning and ending locations of each of the geographic areas (e.g., the boundaries). For each geographic area, the route database may include a spatial marker that identifies the environmental data for that geographic area based on the time of year. For example, the spatial marker for the first geographic area may include an average temperature range and an average pressure range for the specific time of the year that the trip is to occur. The average temperature range may be, for example, between twenty degrees Fahrenheit and sixty degrees Fahrenheit, and the average pressure range may be, for example, between eleven pounds per square inch and thirteen pounds per square inch. The spatial markers for the other geographic areas may have different average temperatures and/or different average pressures relative to the spatial marker of the first geographic area (and each other). The route database optionally may be stored in the memory of the energy management system.

At step 306, power output capability ranges for the vehicle system traveling through the geographic areas during the trip are determined. A corresponding power output capability range is determined for each of the geographic areas along the route. The power output capability ranges are determined based on vehicle characteristics of the vehicle system and the environmental data in each of the spatial markers. For example, the vehicle characteristics may include the type of engine(s) in the propulsion system, specifications of the engine(s) (e.g., the rated power output capabilities (horsepower) thereof), and/or the like. Optionally, additional vehicle characteristics may be used to determine the power output capability range, such as a health, age, or condition of the engine(s). The power output capability ranges may also be determined based on field experience (e.g., information obtained during one or more earlier trips) and analysis, as described herein.

The power output capability range includes at least one power output upper limit for an engine of the vehicle. For example, the power output upper limit may be determined to be 4,300 kW, so the power output capability range is a range between a lower limit, such as zero kW, and the upper limit of 4,300 kW. The power output capability range can represent a range of power outputs that the engine is determined to be able to provide within the particular geographic area as the vehicle system travels through that area during the trip. For example, the power output capability range for each geographic area can be based on performance (e.g., expected and/or historical performance) of the engine through the particular geographic area when exposed to ambient temperatures within the average temperature range and ambient pressures within the average pressure range for that geographic area during the time of the year of the trip. The power output capability ranges account for variations in performance capability of the engines due to the differing environmental conditions experienced by the vehicle system while traveling through the different geographic areas. For example, the power output upper limit represents a power output that the propulsion system of the propulsion-generating vehicle is predicted to be capable of achieving in the conditions, even though that power output may be lower than a rated power output which the propulsion system is designed to achieve. For example, the engine of the propulsion system may be rated for a power output of 4,500 KW, but the power output capability range for the engine based on a given geographic area during a given time of the year may be determined to have a power output upper limit of 4,400 kW due to the conditions and the need for deration of the engine while operating in the conditions (to avoid damage to the engine and/or engine components).

In an embodiment, the one or more processors can determine the power output capability range using an engine performance map that corresponds to the one or more engines of the propulsion system of the vehicle. FIG. 5 is a table illustrating one example of an engine performance map 502 for an engine of the propulsion system of the vehicle. The engine performance map may be stored in the memory of the energy management system, or alternatively may be stored in the memory of the vehicle controller or in the memory of the dispatch facility. The engine performance map provides power output upper limits for an engine of the vehicle system based on corresponding temperature and pressure values derived from the environmental data. For example, the engine performance map provides power output upper limits of the engine when exposed to different ambient temperatures and pressures. These upper limits may indicate how much power the engine can generate or output without damaging the engine or engine components. Stated differently, controlling the engine (e.g., via a high throttle setting) to output more than a power output upper limit may result in damage to the engine or engine components.

In the table, a horizontal or x-axis 504 represents values of barometric pressures from the environmental data. A vertical or y-axis 506 represents values of turbo inlet air temperatures from the environmental data. The engine performance map in FIG. 17 includes variables A, B, and C to represent three different temperature values, and the variables X, Y, and Z to represent three different pressure values. Cells 508 of the engine performance map represent values of power output upper limits (e.g., horsepower), and are labeled in the map as (1), (2), (3), (4), (5), (6), (7), (8), and (9). The engine performance map shown in FIG. 17 is provided as a general illustration to describe the layout of an engine performance map, such that an actual engine performance map would include quantitative values for the variables A-C, X-Z, and (1)-(9). An engine performance map may include more than three temperature values and pressure values in various embodiments. The engine performance map may be specific to the type of engine and/or type of propulsion-generating vehicle as the propulsion-generating vehicle of the vehicle system.

The horsepower data that populates the cells of the engine performance map may be derived at least partially from field experience data, such as empirical historical data from sensors that monitor engine performance during prior trips. For example, sensors on propulsion systems of vehicles may monitor ambient temperatures and pressures during a past trip, as well as both the power outputs commanded by control of the engines and the actual power outputs of the engines. In a hypothetical example, the commanded power output of an engine may have been 4,450 kW while a vehicle was traveling in an air temperature of twenty degrees Fahrenheit and a pressure of twelve pounds per square inch. If the propulsion sensors determine that the actual power output provided by the engine was only 4,330 kW, then this can indicate that the engine and/or engine components either were derated or needed to have been derated (e.g., should have been derated as the engine and/or components were potentially damaged or otherwise incapable of operating to produce the commanded output). As a result, a need for deration may be identified due to the environmental conditions. Based on this field experience, the 4,330 kW that the engine actually did provide may be recorded in an engine performance map as a power output upper limit corresponding to the temperature of twenty degrees Fahrenheit and the pressure of twelve pounds per square inch. Referring to FIG. 17, the engine performance map may be populated such that the variable X is twelve pounds per square inch, the variable A is twenty degrees Fahrenheit, and the variable (1) is 4,330 kW. The actual power output of an engine during a trip, such as the 4,330 kW in the example above, may be measured and/or calculated using one or more sensors, such as a dynamometer, an electrical voltage sensor, an oxygen sensor, a mass air flow sensor, a position sensor, and/or the like. The temperature and pressure experienced by the vehicle during the trip may be monitored using corresponding sensors disposed onboard the vehicle, on wayside devices, or based on weather data that is received from a remote source, such as a weather center.

The engine performance map can be populated with data from various different past trips of vehicles with the same type (or at least a similar type) of engine and/or propulsion system as the vehicle. In an embodiment, the engine performance map in FIG. 5 may correspond to an engine that is rated to produce 4,500 kW. The power output upper limits in some of the cells may be equal to 4,500 kW, while the power output limits in other cells may be less than 4,500 KW, due to the environmental conditions. An engine performance map corresponding to a different engine or propulsion system would contain different populated values of the power output upper limits.

Optionally, some of the data in the engine performance map may be calculated based on the recorded field experience data from the past trips of the same or similar vehicles. For example, some of the power output upper limit values may be extrapolated based on the recorded data. Optionally, the propulsion system of the vehicle may be modeled using physics-based modeling to derive at least some of the power output upper limit values in the engine performance map.

The engine performance map provides a power output upper limit for each of various different air temperatures and pressures that may be experienced by the vehicle system during a trip. These limits can indicate the maximum or upper limit on power that can or should be produced from an engine before damage will or was detected to occur. For example, referring to the engine performance map, if the spatial marker associated with the first geographic area of the route indicates an average temperature value represented by variable B in the map and an average pressure represented by variable Y in the map at the time of the year that the vehicle system will be traveling through the first geographic area during the trip, then the engine performance map provides a power output upper limit value represented by variable (5). If the power output upper limit represented by variable (5) is 4,380 kW, then the power output capability range for the vehicle system traveling through the first geographic area during the trip is determined to be between zero and 4,380 kW. The second geographic area may have a different average temperature and/or average pressure at that time of the year relative to the first geographic area, and therefore the power output upper limit (and power output capability range) for the second geographic area, according to the engine performance map, may differ from the power output upper limit for the first geographic area. Therefore, the engine performance map is used to determine a respective power output capability range for each of the geographic areas along the route.

Optionally, the power output capability range for a given geographic area may include multiple power output upper limits based on the environmental data. For example, since the environmental data for a geographic area may include a temperature range between a low temperature and a high temperature and/or a pressure range between a low pressure and a high pressure, multiple power output upper limits may be determined using the engine performance map based on different combinations of the temperature and pressure boundary values. In a hypothetical example using the map, a temperature range is between values represented by variables A and C, and a pressure range is between values represented by variables X and Z. The engine performance map provides four data points representing potential power output upper limits for these ranges including the variable (1) at the intersection of temperature A and pressure X, the variable (3) at the intersection of temperature A and pressure Z, the variable (7) at the intersection of temperature C and pressure X, and the variable (9) at the intersection of temperature C and pressure Z. It is possible that at least some of the power output upper limits represented by variables (1), (3), (7), and (9) may be the same. If all of the power output upper limits provided by the map for the corresponding environmental data are the same, then that horsepower value may be used as the power output upper limit of the power output capability range. On the other hand, if at least some of the values represented by the variables (1), (3), (7), and (9) differ, then a power output upper limit may be determined by selecting one of these horsepower values or by using these horsepower values to calculate the power output upper limit.

In one embodiment, the power output capability range is conservatively determined to extend up to the lowest horsepower value represented by the variables (1), (3), (7), and (9) in the engine performance map. Hypothetically, the lowest horsepower value out of the values represented by the variables (1), (3), (7), and (9) may be 4,150 kW. Therefore, by derating the engine(s) and operating the vehicle system 100 during the trip without exceeding 4,150 KW as the vehicle system travels through the corresponding geographic area, then the propulsion system is expected to meet the power commands without experiencing damage to the engine or engine components.

In another embodiment, the power output capability range is liberally determined to extend up to the greatest horsepower value represented by the variables (1), (3), (7), and (9) in the engine performance map. Hypothetically, the greatest horsepower value out of the values represented by the variables (1), (3), (7), and (9) may be 4,500 kW. By operating the vehicle system with the upper limit of 4,500 kW through the corresponding geographic area, the engine may or may not require deration to avoid damage, depending on the actual environmental conditions experienced during the trip. Although there is a risk that the engine may be damaged, the greater power output upper limit may result in better overall performance of the vehicle system through the geographic area relative to the more conservative upper limit of 4,150 kW. For example, the vehicle system may travel faster through the area by abiding by the greater power output upper limit. In other embodiments, the power output capability range may be selected to extend to an intermediate horsepower value out of the values represented by the variables (1), (3), (7), and (9) in the engine performance map and/or may extend to an upper limit calculated as an average or median of at least some of the horsepower values represented by the variables (1), (3), (7), and (9) in the engine performance map. For example, the power output capability range may be selected to extend to a power output upper limit calculated as the average between the greatest horsepower value of 4,500 kW and the least horsepower value of 4,150 KW, which is 4,325 kW.

At step 308, a trip plan is optionally provided for the trip of the vehicle system along the route based on the determined power output capability ranges of the various geographic areas along the route. As described above, the trip plan designates operational settings, such as throttle settings and brake settings, for the vehicle to control the movement of the vehicle system during the trip. The operational settings correspond to the progression of the vehicle system along the trip, such as the location of the vehicle system, the distance traveled from a designated location (e.g., the starting location), and/or a time elapsed since passing the designated location or another location. In an embodiment, the trip plan is provided based on the power output upper limit of each of the power output capability ranges for the different geographic areas. The power output upper limits may be used as constraints, such that the throttle settings designated by the trip plan do not result in the power output of the propulsion system during the trip exceeding the power output upper limit for a corresponding geographic area. This can result in derating the engine to avoid damaging the engine. For example, the determined power output capability ranges include an upper limit of 4,100 kW for the first geographic area, an upper limit of 4,450 kW for the second geographic area, and an upper limit of 4,300 kW for the third geographic area. As a result, the trip plan is provided such that the designated throttle settings do not cause the power output of the vehicle to exceed 4,100 KW as the vehicle system travels through the first geographic area, the throttle settings do not cause the power output to exceed 4,450 KW as the vehicle system travels through the second geographic area, and the throttle settings do not cause the power output to exceed 4,300 kW as the vehicle system travels through the third geographic area. Therefore, the power output of the vehicle while traveling in the second geographic area may be controlled to exceed the upper limit associated with the first geographic area (e.g., 4,100 KW) without concern of damage as long as the power output does not exceed the upper limit associated with the second geographic area (e.g., 4,450 kW). The trip plan may be provided by generating a new trip plan or selecting a previously-created trip plan from a group of stored trip plans. For example, a previously-created trip plan may be selected that meets the power output upper limit constraints for the different geographic areas and also achieves other goals, such as arriving on time, reducing fuel consumption, and/or reducing total trip time.

The trip plan may be created or modified to direct the engine(s) to derate prior to reaching (or upon reaching) a problem area. The problem area may be a geographic area where it is determined that a need for deration may exist. As described above, such areas may be identified based on elevated temperatures, reduced oxygen levels, and the like. The trip plan may direct an engine to derate (e.g., to generate no more power than a reduced limit that is lower than the rated power capability of the engine or another, previous greater limit on power output by the engine) prior to reaching or upon reaching the area. This can prevent damage to the engine and/or components of the engine. As described herein, the reduced power output from this engine may be replaced or supplanted with increased power output from another engine (e.g., that has not yet reached the area, that has a higher rated power output capability, etc.) and/or powering motors with onboard energy storage devices and/or off-board power sources.

The trip plan can be created or modified to avoid traveling through areas where a need for deration is identified (or has a likelihood exceeding a threshold) during certain times. For example, if a need for deration or a high likelihood of deration is associated with a geographic area due to elevated temperatures, then the trip plan can be created or modified to direct the same vehicle system to travel through the same area but at a different time of day (e.g., night), when the temperatures may be cooler. As another example, if a need for deration or a high likelihood of deration is associated with a geographic area due to weather conditions, then the trip plan can be created or modified to direct the same vehicle system to travel through the same area but at a different time of day (e.g., another day or week), when the weather conditions may change (e.g., and be cooler, have more oxygen in the air, etc.).

At step 310, the movement of the vehicle system during the trip is controlled such that the vehicle system produces power outputs within the designated power output capability ranges associated with the different geographic areas. The vehicle system is controlled to not exceed the corresponding power output upper limits as the vehicle system travels through each of the geographic areas. Since the vehicle system travels within the determined power output capability ranges, the propulsion system of each propulsion-generating vehicle will be able to produce the commanded power outputs without experiencing damage. In one embodiment, to supplant the power lost due to operating at lower power outputs, another source of power may be used. For example, the vehicle in the vehicle system that is limited to a reduced power output may be traveling in an airflow restricted area (e.g., a tunnel), but another vehicle in the same vehicle system may not be in the airflow restricted area (e.g., may be outside the tunnel). The vehicle that is outside the airflow restricted area may increase the power limit or may otherwise generate increased power to supplant some or all the reduced power output from the vehicle in the airflow restricted area. As another example, the vehicle in the vehicle system that is traveling in the airflow restricted area may switch from powering the motor(s) of the vehicle with operation of the engine to powering the motor(s) with electric energy from an onboard energy storage device (such as one or more batteries, fuel cells (which store energy in terms of the chemical energy in the fuel prior to being converted into electric energy), or supercapacitors) and/or an off-board energy source (such as a catenary or electrified rail).

In an embodiment, the movement of the vehicle system is controlled by communicating instructions in the form of control signals either to the vehicle controller or directly to the propulsion system of the vehicle. For example, the one or more processors of the energy management system may convey control signals that include designated operational settings (e.g., throttle and/or brake settings) to the propulsion system or to the vehicle controller. The control signals may be automatically implemented by the vehicle controller and/or the propulsion system to control the movement of the vehicle system. In another embodiment, the instructions are contained within the trip plan, and the trip plan is communicated to the vehicle controller to control the movement of the vehicle system during the trip. For example, the one or more processors of the energy management system may convey the generated or selected trip plan to the vehicle controller, and the vehicle controller may implement the trip plan during the trip by transmitting control signals based on the trip plan to the propulsion system.

In one embodiment, the steps 302, 304, 306, and 308 of the method 300 are performed prior to the vehicle system starting the trip. For example, the power output capability ranges for the different geographic areas are determined based on environmental conditions that the vehicle system is predicted to experience during the upcoming trip, and the trip plan is generated or selected prior to the trip. The trip plan may be revised or updated during the trip based on real-time feedback. In an alternative embodiment, at least some of the steps 302, 304, 306, and 308 of the method 300 may be performed after the vehicle system has started moving along the route during the trip, but before the vehicle system travels through a designated geographic area. As the vehicle system travels through the first geographic area, the one or more processors of the energy management system may perform one or more of the steps 302, 304, 306, and 308 for upcoming geographic areas along the route. For example, while the vehicle system travels through the first geographic area, the one or more processors may determine the power output capability range for the second geographic area and/or create or select a trip plan for controlling the movement of the vehicle system through the second area.

Although in one embodiment the one or more processors of the energy management system onboard the vehicle perform the entire method, in an alternative embodiment the one or more processors of the vehicle controller perform at least part of the method. For example, the one or more processors of the energy management system may only provide the trip plan at 308, and the one or more processors of the vehicle controller may perform the other steps of the method. In another alternative embodiment, the method may be performed at least partially off-board the vehicle system, such as by the one or more processors at the dispatch facility. For example, the one or more processors may perform the entire method, and may control the movement of the vehicle system during the trip at step 310 by wirelessly communicating instructions, such as a trip plan or control signals, to the vehicle via the communication device. The instructions received may be implemented by the vehicle controller onboard the vehicle. In such an alternative embodiment, the vehicle optionally may not have an onboard energy management system, or at least does not use the energy management system to perform the method.

Figure 18:
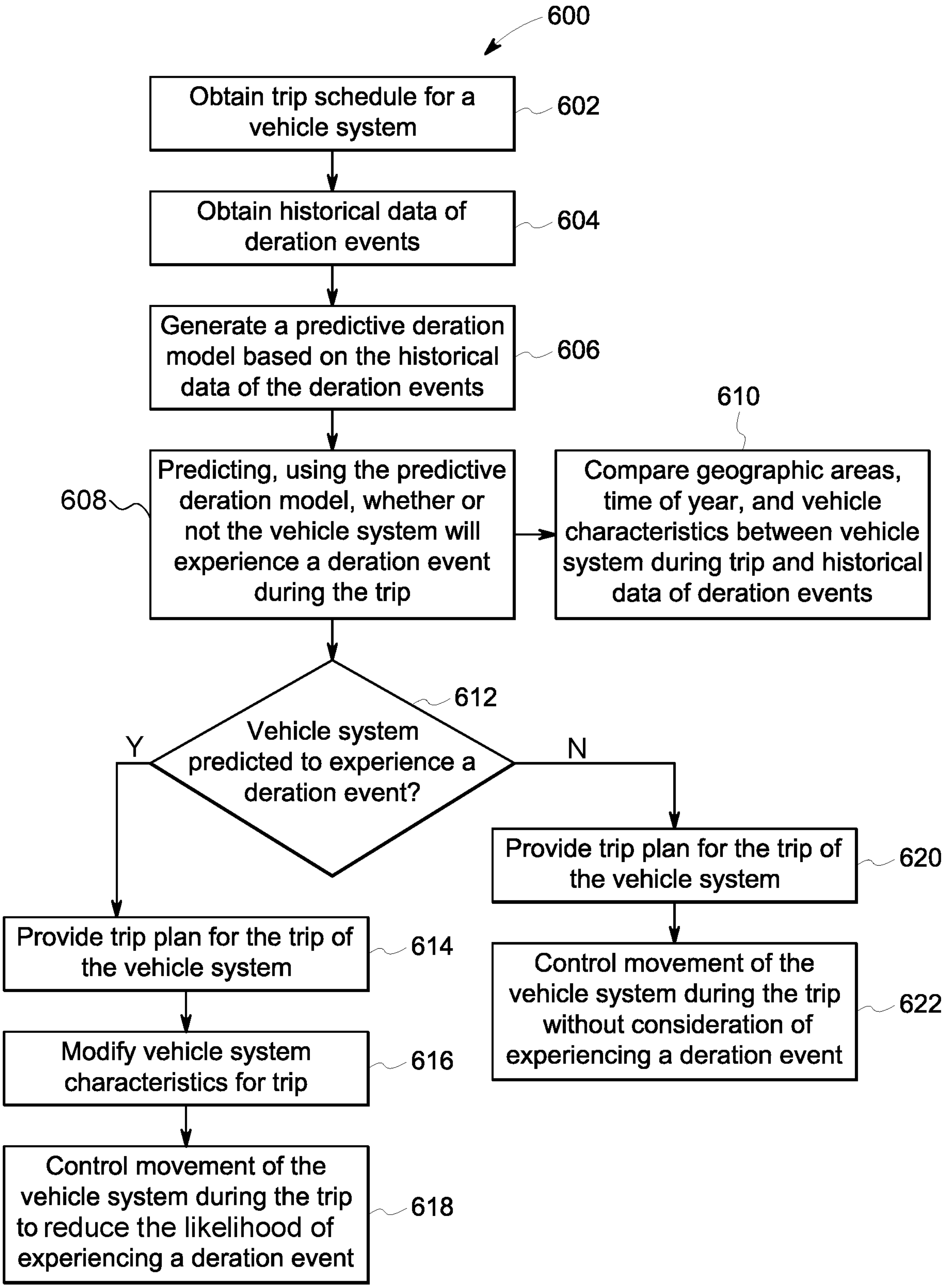
FIG. 18 is a flowchart of an embodiment of another method for controlling a vehicle system along a route during a trip.

FIG. 18 is a flowchart of an embodiment of another method 600 for controlling a vehicle system along a route during a trip. The method 600 is described in connection with the vehicle control system as shown in FIG. 1. For example, in one embodiment the method 600 can be performed in full by the one or more processors of the energy management system. In alternative embodiments, the method 600 can be performed in full or in part by the one or more processors of the vehicle controller and/or the one or more processors of the dispatch facility. Like the method shown in FIG. 3, the method shown in FIG. 6 is configured to control movement of the vehicle system during a trip to reduce the likelihood of the engines derating during the trip, yielding better movement planning and vehicle handling during the trip relative to controlling the vehicle system without accounting for potential engine deration. However, the method 600 uses historical data of deration events experienced by vehicle systems during past trips, and may not use the environmental data that is used by the method 300.

At step 602, a trip schedule is obtained for a scheduled trip of a vehicle system. The trip schedule identifies the route and the date that the trip occurs. At step 604, historical data of deration events is obtained. The historical data includes information about actual engine output that has occurred during past trips to various vehicle systems. The historical data may be obtained from a remote database, such as the diagnostic database in the memory at the dispatch facility. For example, for a group of vehicle systems that travel in a network, each time that a vehicle system in the group detects damage to an engine or a need to derate the engine to avoid damage (e.g., a deration event), that vehicle system may communicate information about the damage or deration event remotely. The information is collected and stored in the diagnostic database. A vehicle system may be configured to detect a deration event when the vehicle system determines that the actual power output provided by an engine or propulsion system of the vehicle system is intentionally reduced below a commanded power output (e.g., from a trip plan). Optionally, since a nominal amount of engine performance variation is expected due to variables unrelated to deration, the vehicle systems may detect deration events when the difference between actual power output and the commanded power output exceeds a designated variance threshold. The variance threshold may be 5% of the commanded power output, 10% of the commanded power output, or the like.

When a vehicle system experiences a deration event, the information that is communicated and stored in the database may include vehicle characteristics that identify the vehicle system and trip characteristics that identify the trip, the route, the date that the deration event occurred, and the geographic location at which the deration event occurred. Optionally, the information that is logged may also include deration characteristics, such as the commanded power output during the deration event and the actual power output provided during the deration event. The vehicle characteristics may include additional information about the vehicle system, such as the type of engine(s), the type of propulsion system, the type of propulsion-generating vehicle, a rated power output capability of the derated engine, a number of the propulsion-generating vehicles in the vehicle system, a total weight of the vehicle system, a vehicle makeup of the vehicle system, and the like. The vehicle makeup may refer to the arrangement of the propulsion-generating vehicles relative to non-propulsion-generating vehicles in the vehicle system, the number and type of non-propulsion-generating vehicles, the type of cargo carried by the vehicle system, or the like.

In an embodiment, the network of vehicle systems from which the deration information is collected is a broad network. For example, the diagnostic database may collect and aggregate historical data of deration events from vehicle systems traveling throughout the contiguous United States, as wells as parts of Canada and Mexico. The number of deration events stored in the database may total in the thousands. The data may be collected over one or more years.

Figure 19:
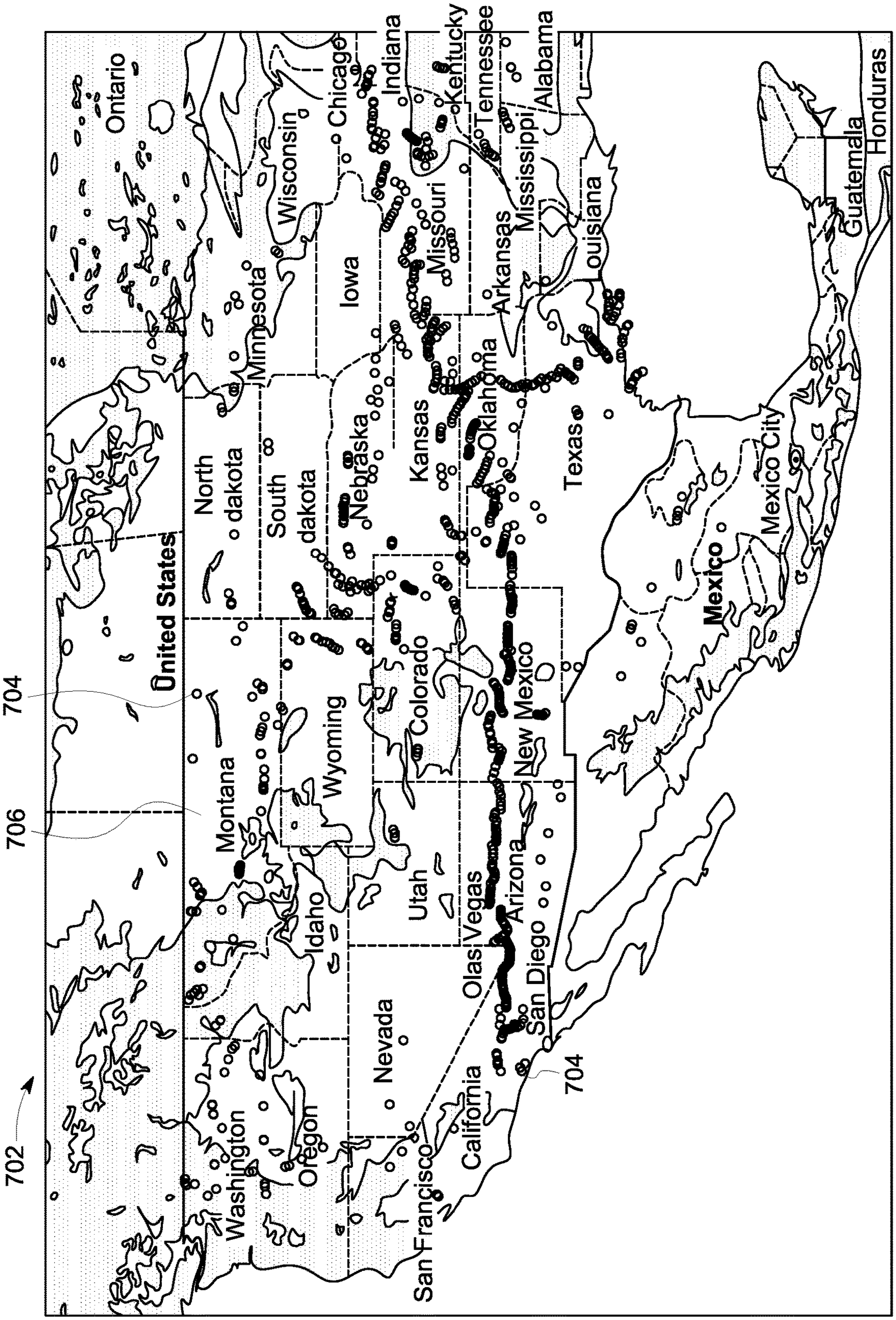
FIG. 19 illustrates a deration map that plots the locations of recorded deration events as event markers on a map of the United States.

FIG. 19 illustrates a deration map 702 that plots the locations of recorded deration events as event markers 704 on a map 706 of the United States. Each event marker on the deration map represents the geographic location in which one of the vehicle systems in the network experienced damage or a deration event during a past trip. As shown in FIG. 7, some geographic areas include clusters of event markers indicating a greater number or volume of derations events relative to other, less-clustered areas on the deration map. Although the deration map in FIG. 19 only shows the geographic locations of recorded deration events, the deration map optionally may include additional information about the deration events, such as the time of the year in which the deration events occurred. For example, the event markers in an alternative embodiment may be color-coded based on the time of the year, such as the week, month, or season.

At step 606, a predictive deration model is generated based on the historical data of the damage or deration events. The predictive deration model is used to predict whether the vehicle system will need to derate an engine during an upcoming trip (or during an upcoming segment of a current trip) to avoid damaging the engine and/or engine components.

In one embodiment, the historical events may be classified based on different categories, such as geographic area in which the deration event occurred, time of the year in which the deration event occurred, and vehicle characteristics of the vehicle system that experienced the deration event. At steps 610, the predictive deration model is used to compare the trip information of the vehicle system to the events in the historical data by correlating the trip of the vehicle system with the events with regard to the identified relevant categories. For example, the predictive model is used to compare the geographic areas through which the vehicle system will travel to the geographic locations where the damage or deration events occurred in the past. This comparison can involve determining whether the vehicle system will travel through or over some of the same segments of prior trips of the same or other vehicle systems where damage or deration occurred. The time of the year in which the trip of the vehicle system is scheduled is also compared to the times of the year in which the recorded damage or deration events occurred. Furthermore, the characteristics of the vehicle system are compared to the vehicle characteristics of the vehicle systems that experienced deration events. If the same route segments are being traveled over, the travel over these segments will occur at the same time (or within a designated threshold, such as four weeks), and/or the vehicle system has the same characteristics of the vehicle system(s) previously experiencing the damage or deration events (or within a designated threshold of each other, such as 10%), then the vehicle system may be expected to experience damage or deration in the same or similar (within a threshold distance, such as one mile) location as the prior vehicle system(s).

The predictive model may be a predictive analytical model that categorizes and compares the control data (e.g., the historical data of the damage or deration events) to the variable data (e.g., the trip information of the vehicle system) to identify patterns, correlations and/or make predictions about whether the trip of the vehicle system will be similar to the trips in the control data, as described above. Therefore, the predictive deration model may be used by inputting the trip information of the vehicle system, including the route of the trip, the time of the year of the trip, and the vehicle characteristics, such as the type (e.g., brand, maker, or model number) of propulsion-generating vehicles in the vehicle system.

The prediction of whether the vehicle system will experience a deration event during the trip is based on a correlation between the trip information for the vehicle system and the historical data of damage or deration events. If the predictive deration model identifies one or more damage or deration events in the historical data that match the trip information for the vehicle system in all or at least a threshold number of the relevant categories analyzed, then the vehicle system may be predicted to experience a damage or deration event during the trip. The likelihood of a need for deration of a vehicle system during an upcoming trip can increase as the number of categories or characteristics of that vehicle system matching the categories or characteristics of the prior vehicle systems experiencing deration (or a need for deration) increases. Similarly, the likelihood of the need for deration of the vehicle system during the upcoming trip can decrease as the number of categories or characteristics of that vehicle system matching the categories or characteristics of the prior vehicle systems experiencing deration (or a need for deration) decreases. In one embodiment, if the number of matching categories or characteristics between the vehicle systems is 80%, then there is an 80% likelihood of a need for deration; if the number of matching categories or characteristics between the vehicle systems is 36%, then there is an 36% likelihood of a need for deration; and so on.

For example, if three vehicle systems within the last two years experienced deration events while traveling through the first geographic area of the route during the same time of the year that the trip is to occur, and the vehicle systems included the same type of propulsion systems as the propulsion system, then there is a high likelihood that the vehicle system will also experience damage or require deration to avoid damage traveling through the first geographic area. However, if the three vehicle systems all experienced the deration events in July when the air temperature is very hot, and the trip of the vehicle system is scheduled for March when the air temperature is mild, then the prediction may be different because now only two of the three categories match between the scheduled trip and the historical damage or deration events. For example, if no damage or deration events in the historical data match the trip information for the upcoming trip of the vehicle system in all relevant categories, then it may be predicted that the vehicle system will not experience a damage or deration event, or at least is less likely to experience a damage or deration event than if there was a stronger correlation.

Although the predictive deration model is described above as comparing the trip information for the vehicle system to the deration events in only three categories, optionally the vehicle characteristics category may be divided into multiple separate categories. For example, in addition to analyzing the type of engine or propulsion systems on the vehicle systems (which generally provides engine performance ratings), an additional category can be made for the total weight of the vehicle systems within certain weight ranges. Yet another category can be made for the vehicle makeup, such as whether the vehicle system is an intermodal vehicle or a unit vehicle.

Optionally, the trip may be segmented such that a separate prediction is made as to whether the vehicle system will experience a damage or deration event as the vehicle system travels through each of the multiple geographic areas along the route. It is possible that the vehicle system is predicted to experience damage or deration events in some areas along the route but not others.

At step 612, if the vehicle system is predicted to experience a damage or deration event during the scheduled trip as the vehicle system travels along the route (even if only along or through one of the geographic areas of the route), then flow proceeds to step 614. At step 614, a trip plan is provided for the trip of the vehicle system. The trip plan may be generated or selected to control the vehicle system during the trip to prevent the vehicle system from experiencing (or at least reduce a likelihood of the vehicle system experiencing) the predicted damage or deration event. As described above, the trip plan designates operational settings, such as throttle settings and brake settings, to control the movement of the vehicle system during the trip. The trip plan may reduce the likelihood of the vehicle system experiencing the predicted damage or deration event by designating reduced throttle settings for when the vehicle system travels through the one or more geographic areas in which the vehicle system is predicted to experience the damage or deration event, by directing another source of motive power to supplant or replace all or part of the power output from an engine (e.g., motors powered by onboard energy storage devices and/or off-board power sources). The reduced throttle settings are relative to the throttle settings that would have been designated without accounting for the likelihood of damage or deration.

At step 616, the vehicle system characteristics may be modified for the trip of the vehicle system to prevent or reduce the likelihood of the engine(s) of vehicle system being damaged or derated. For example, the type of propulsion-generating vehicle(s) used in the vehicle system may be changed to a different type that is better able to provide the commanded power output without derating. In another example, the number of propulsion-generating vehicles in the vehicle system that provide power output may be changed, such as to add one or more additional propulsion-generating vehicles or activate a propulsion-generating vehicle that is present in the vehicle system but inactive (e.g., not providing power output).

At step 618, the movement of the vehicle system during the trip is controlled to reduce the likelihood of engine(s) of the vehicle system being damaged or derated. For example, the movement may be controlled to prevent or reduce the likelihood of damage to an engine or needing to derate the engine to avoid damage by redistributing designated power outputs that are to be provided by the engines in the different propulsion-generating vehicles of the vehicle system, by supplanting decreased power output from engine(s) with energy from energy storage devices or off-board energy source to power motors, etc. Thus, as the vehicle system travels through a geographic area in which the vehicle system is predicted to experience a need for a deration event, instead of a single vehicle producing 4,500 kW and predictably needing deration while a second vehicle in the vehicle system produces 3,000 kW, the designated power outputs may be redistributed such that the first vehicle produces 4,000 kW and the second vehicle produces 3,500 kW. As a result, the total power output is the same and the need for the engine in the first vehicle to derate is less.

In another example, the movement may be controlled to reduce the likelihood of experiencing the deration event(s) by controlling one or more of the propulsion-generating vehicles to provide reduced power outputs relative to the outputs that would be provided without accounting for the risk of deration. Optionally, the reduced power output may be based on the historical data of the deration events. For example, the historical data may include the commanded power output as well as the actual power output provided by a propulsion-generating vehicle that experienced a deration event along the same geographic area and during the same time of the year as the trip of the vehicle system. Using this information, the movement of the vehicle system through this geographic area may be controlled such that the propulsion-generating vehicle is commanded to provide a power output that does not exceed the actual power output from the historical data, for example. By preventing the propulsion-generating vehicle of the vehicle system from exceeding the actual output that the vehicle was able to generate during the deration event, the propulsion-generating vehicle may be unlikely to derate.

In an embodiment, the movement of the vehicle system is controlled by communicating instructions in the form of control signals either to the vehicle controller or directly to the propulsion system of the vehicle, such as to an engine control unit of the vehicle. For example, the one or more processors of the energy management system may convey control signals that include designated operational settings (e.g., throttle and/or brake settings) to the propulsion system or to the vehicle controller. The control signals may be automatically implemented by the vehicle controller and/or the propulsion system to control the movement of the vehicle system. In another embodiment, the instructions are contained within the trip plan, and the trip plan is communicated to the vehicle controller to control the movement of the vehicle system during the trip. For example, the one or more processors of the energy management system may convey the generated or selected trip plan to the vehicle controller, and the vehicle controller may implement the trip plan during the trip by transmitting control signals based on the trip plan to the propulsion system.

Returning to step 612, if it is determined that the vehicle system is not predicted to experience a deration event during the trip, then flow continues to step 620 and a trip plan is optionally provided for the trip of the vehicle system. The trip plan may be generated or selected from a pre-existing trip plan that is stored in a memory. At step 622, the movement of the vehicle system during the trip can be controlled without consideration of experiencing a deration event. For example, the movements may be controlled based on goals (e.g., meeting arrival times, reducing fuel consumption, and reducing total trip time, etc.), internal vehicle limitations (e.g., acceleration limits, power limits, etc.), and external constraints (e.g., speed limits), but are not controlled based on reducing the likelihood of experiencing deration events and therefore reducing the number of deration events experienced.

In one embodiment, the steps 602, 604, 606, 608, 612, 614, 616, and 620 of the method 600 are performed prior to the vehicle system starting the trip. For example, the predictive deration model is used to predict whether the vehicle system will experience a need for a deration event along the trip, and the trip plan is generated or selected based on the prediction prior to the trip. The trip plan may be revised or updated during the trip based on real-time feedback. In an alternative embodiment, at least some of the steps 602, 604, 606, 608, 612, 614, 616, and 620 of the method 600 may be performed after the vehicle system has started moving along the route during the trip, but before the vehicle system travels through a designated geographic area. For example, as the vehicle system travels through the first geographic area, the one or more processors of the energy management system may perform one or more of the steps 602, 604, 606, 608, 612, 614, 616, and 620 for upcoming geographic areas along the route.

In one embodiment the one or more processors of the energy management system onboard the vehicle perform the entire method 600. For example, the one or more processors obtain the historical data of the deration events or need for deration, and generate the predictive deration model based on the historical data. In an alternative embodiment, the predictive deration model is previously generated based on the historical data and is not generated by the one or more processors of the energy management system. For example, the one or more processors access and utilize the predictive deration model, but do not perform the steps at 604 and 606 to generate the model or obtain the historical data used to create the model.

In another alternative embodiment, the one or more processors of the vehicle controller perform at least part of the method 600. For example, the one or more processors of the energy management system may only provide the trip plan at steps 614 and 620, and the one or more processors of the vehicle controller may perform the other steps of the method 600 (with the possible exception of steps 604 and 606). In yet another alternative embodiment, the method 600 may be performed at least partially off-board the vehicle system, such as by the one or more processors at the dispatch facility. For example, the one or more processors may perform the entire method 600, and may control the movement of the vehicle system during the trip at steps 618 and 622 by wirelessly communicating instructions, such as a trip plan or control signals, to the vehicle via the communication device. The instructions received may be implemented by the vehicle controller onboard the vehicle. In such an alternative embodiment, the vehicle optionally may not have an onboard energy management system, or at least does not use the energy management system to perform the method 600.

One or more technical effects of the systems and methods described herein include reducing the occurrence of deration events during vehicle trips. Avoiding deration events or needs to derate has several advantages over vehicle systems that experience deration events during trips, including better control and handling of the vehicle system, an improved ability to plan the movement of the vehicle system, and an increased component operational lifetime. For example, deration events may apply certain stresses or strains on various components of the vehicle system, such that avoiding deration events may increase the operating life of the components and reduce maintenance and repair costs. Furthermore, avoiding deration events may improve fuel efficiency, as fuel is not wasted by supplying fuel to an engine that the engine cannot utilize to provide power.

In an embodiment, a system includes one or more processors configured to obtain environmental data geographically and temporally corresponding to scheduled travel of a vehicle system. The one or more processors are further configured to determine a power output capability range for the vehicle system traveling during a trip based on the environmental data that is obtained. The one or more processors are further configured to communicate instructions to at least one of a propulsion system of the vehicle system or a vehicle controller of the vehicle system for controlling movement of the vehicle system during the trip such that the vehicle system produces a power output within the power output capability range as the vehicle system travels. The environmental data includes historical values of one or more of temperature, pressure, or air constituency in geographic areas through which the vehicle system will travel during the trip.

The one or more processors may determine the power output capability range for the vehicle system traveling through the geographic areas before the vehicle system starts moving along a route for the trip. The one or more processors can determine the power output capability range for the vehicle system traveling through the geographic areas after the vehicle system has started moving along a route for the trip and before the vehicle system travels through the geographic areas. The one or more processors can be disposed onboard the vehicle system. The one or more processors can be disposed off-board from the vehicle system. The one or more processors may communicate instructions to control the movement of the vehicle system during the trip by wirelessly communicating one or more of a trip plan or control signals via a communication device.

The one or more processors may generate or select a trip plan for the vehicle system based on the power output capability range that is determined. The trip plan can designate operational settings for the vehicle system to control the movement of the vehicle system through the geographic areas during the trip.

The power output capability range can include at least a first power output upper limit and a second power output upper limit. The one or more processors may generate the trip plan using at least one of the first power output upper limit or the second power output upper limit as a constraint. The one or more processors can determine the power output capability range using an engine performance map that is stored in a memory. The engine performance map may provide at least one power output upper limit for an engine of the vehicle system based on corresponding historical values of temperature and pressure in the environmental data and field experience data representing monitored engine performance of the same vehicle system or similar vehicle systems during prior trips.

The environmental data can include an average temperature range and an average pressure range for the geographic areas through which the vehicle system is scheduled to travel during a time of the year that the vehicle system is scheduled to travel through the geographic areas. The power output capability range may be determined according to performance of the engine at ambient temperatures within the average temperature range and at ambient pressures within the average pressure range.

The environmental data can include an average temperature range and an average pressure range during a time of the year for multiple geographic areas through which the vehicle system is scheduled to travel during the trip. The one or more processors may determine multiple power output capability ranges for the vehicle system during the trip. Each of the power output capability ranges can correspond to one of the geographic areas. The environmental data can be obtained from an off-board database.

In an embodiment, a system includes one or more processors that can predict, using a predictive deration model, whether or not a first vehicle system scheduled to travel along a route during a trip will experience a need for a deration event at a designated geographic area during the trip. The predictive deration model can be generated based on historical data of deration events experienced by plural vehicle systems. The historical data can include geographic locations of the deration events, times of the year that the deration events were experienced, and vehicle characteristics of the vehicle systems that experienced the deration events. The one or more processors can communicate instructions to control movement of the first vehicle system during the trip based on the prediction such that the first vehicle system does not experience the deration event at the designated geographic area during the trip.

The vehicle characteristics of the vehicle systems that experienced the deration events can include one or more of types of propulsion-generating vehicles in the vehicle systems, rated power output capabilities of engines in the propulsion-generating vehicles, numbers of the propulsion-generating vehicles in the vehicle systems, total weights of the vehicle systems, and vehicle makeups of the vehicle systems. The one or more processors may obtain the historical data of the deration events and generate the predictive deration model based on the historical data of the deration events. The one or more processors can obtain the historical data of the deration events from a diagnostic database. The one or more processors may predict whether or not the first vehicle system will experience a deration event at the designated geographic area during the trip by using the predictive deration model to compare a time of the year of the trip and vehicle characteristics of the first vehicle system with the times of the year that the deration events were experienced at the designated geographic area and the vehicle characteristics of the vehicle systems that experienced the deration events at the designated geographic area.

The one or more processors can use the predictive deration model to predict whether or not the first vehicle system will experience a deration event at any of multiple geographic areas through which the first vehicle system will travel during the trip. In response to predicting that the first vehicle system will experience a need for a deration event at the designated geographic area during the trip, the one or more processors may communicate instructions to one or more of change the type of propulsion-generating vehicle in the first vehicle system, change the number of propulsion-generating vehicles in the first vehicle system that provide power output as the first vehicle system travels through the designated geographic area, and redistribute designated power outputs to be provided by the propulsion-generating vehicles of the first vehicle system as the first vehicle system travels through the designated geographic area to reduce the likelihood of the first vehicle system will experience a need for the deration event at the designated geographic area during the trip.

The historical data of the deration events that is used to generate the predictive deration model can include power outputs provided by the vehicle systems when the vehicle systems experienced the deration events. Responsive to predicting that the first vehicle system will experience a need for deration at the designated geographic area during the trip, the one or more processors can communicate instructions for the first vehicle system to provide a reduced power output when the vehicle system travels through the designated geographic area. The reduced power output may be less than the power outputs provided by the vehicle systems that experienced the deration events.

The one or more processors can generate or select a trip plan for the vehicle system based on the prediction of whether or not the first vehicle system will experience a deration event at the designated geographic area during the trip. The trip plan may designate operational settings for the vehicle system to control the movement of the vehicle system through the designated geographic area during the trip. The one or more processors may predict whether or not the first vehicle system will experience a deration event at the designated geographic area during the trip one or more of before the first vehicle system starts moving along the route during the trip or after the first vehicle system has started moving along the route during the trip but before the first vehicle system travels through the designated geographic area.

In an embodiment, a system includes one or more or more processors that can obtain environmental data geographically and temporally corresponding to a scheduled trip of a vehicle system. The environmental data may represent historical values of one or more of temperature, pressure, or air constituency in geographic areas through which the vehicle system will travel during the trip and a time of year during which the vehicle system is scheduled to travel through the geographic areas on the trip. The one or more processors can determine power output capability ranges for the vehicle system during the trip based on the environmental data. Each power output capability range may correspond to a different one of the geographic areas through which the vehicle system will travel. The one or more processors can communicate instructions to control movement of the vehicle system during the trip such that, as the vehicle system travels through the different geographic areas during the trip, the vehicle system produces power outputs that are within the power output capability ranges associated with the corresponding geographic areas.

The one or more processors can generate or select a trip plan for the vehicle system based on the power output capability ranges that are determined. The trip plan may designate operational settings for the vehicle system to control the movement of the vehicle system through the geographic areas during the trip. Each power output capability range can include at least a first power output upper limit and a second power output upper limit. The one or more processors can generate the trip plan using at least one of the first power output upper limit or the second power output upper limit as a constraint. The one or more processors can determine the power output capability ranges using an engine performance map that is stored in a memory. The engine performance map may provide at least one power output upper limit for an engine of the vehicle system based on corresponding historical values of temperature and pressure in the environmental data and field experience data representing monitored engine performance of the same vehicle system or similar vehicle systems during prior trips.

The environmental data can include an average temperature range and an average pressure range for the geographic areas through which the vehicle system is scheduled to travel during a time of the year that the vehicle system is scheduled to travel through the geographic areas. The power output capability ranges can be determined according to performance of the engine at ambient temperatures within the average temperature range and at ambient pressures within the average pressure range.

In one embodiment, the vehicle control system may have a local data collection system deployed that may use machine learning to enable derivation-based learning outcomes. The vehicle controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of the vehicle system, engines, and/or environment through which the vehicle system and/or engine will operate. With respect to control policies, a neural network can receive input of a number of environmental and task-related parameters. These parameters may include an identification of a determined trip plan for a vehicle system or group, data from various sensors, location and/or position data, environmental data, previous trips of the same or vehicle system(s), the needs for derations and/or deration events of the previous trips, etc. The neural network can be trained to generate an output based on these inputs, with the output representing an action or sequence of actions that the vehicle system should take to accomplish the trip plan (e.g., switching distributions of power outputs of engines, decreasing the power output from some engines while increasing the power output from other engines, powering motors with electric energy from onboard energy storage devices and/or off-board power sources instead of engines, etc.). During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of optimized outcomes, which may be weighed relative to each other.

The controller can use this artificial intelligence or machine learning to receive input (e.g., identification of a determined trip plan for a vehicle system or group, data from various sensors, location and/or position data, environmental data, previous trips of the same or vehicle system(s), the needs for derations and/or deration events of the previous trips, etc.), use a model that associates locations with different operating modes to select an operating mode of the vehicle systems, and then provide an output (e.g., switching distributions of power outputs of engines, decreasing the power output from some engines while increasing the power output from other engines, powering motors with electric energy from onboard energy storage devices and/or off-board power sources instead of engines, etc.). The controller may receive additional input of the change in operating mode that was selected, such as analysis of engine output, completion of the trip relative to a goal, or the like, that indicates whether the machine-selected operating mode provided a desirable outcome or not. Based on this additional input, the controller can change the model, such as by changing power distributions, power sources for motors, etc. that would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

A vehicle control system as described herein can include one or more processors that can identify one or more geographic areas through which a vehicle group is scheduled to travel for an upcoming trip. This area or these areas may be identified as area(s) where there is an increased likelihood of a need for derating one or more engines of the vehicle group. The processor(s) can create or modify a trip plan that dictates one or more operational settings of the vehicle group for one or more of different locations, distances, or times of the upcoming trip. The processor(s) may create or modify the trip plan to avoid a decrease in total power output from the vehicle group within the geographic area(s).

The processor(s) can identify the geographic area(s) from a prior trip of the vehicle group and/or another vehicle group through the geographic area(s) where deration of the engine(s) of the vehicle group and/or at least one other engine of the other vehicle group previously occurred. The processor(s) can identify the geographic area(s) based on a location of one or more airflow restricted areas. The airflow restricted area(s) may include a tunnel, a street or route with tall buildings (e.g., four stories or taller) on both sides of the street or route, an elevated location, or the like.

The engine(s) of the vehicle group can include a first engine onboard a first vehicle of the vehicle group and a second engine onboard a second vehicle of the vehicle group. The processor(s) can create or modify the trip plan to reduce or eliminate the likelihood of the need for derating both the first and second engines of the vehicle group within the geographic area(s) by reducing a throttle setting of the first engine while increasing a throttle setting of the second engine during travel through the geographic area(s). The vehicle group can include one or more motors powered by electric energy generated by operation of the one or more engines. The processor(s) can create or modify the trip plan to direct a reduction in the electric energy generated by the engine(s) to be supplanted with the electric energy supplied by an onboard energy storage device and/or an off-board energy source during travel through the one or more geographic area(s).

The processor(s) can identify the geographic area(s) due to ambient temperatures in the geographic area(s) exceeding a threshold temperature. The processor(s) can create or modify the trip plan to direct the vehicle group to travel through the geographic area(s) at a different time to avoid the ambient temperatures that exceed the threshold temperature.

A method for controlling operation of a vehicle group may include identifying one or more geographic areas through which a vehicle group is scheduled to travel for an upcoming trip where there is an increased likelihood of a need for derating one or more engines of the vehicle group. The method can include creating or modifying a trip plan that dictates one or more operational settings of the vehicle group for one or more of different locations, distances, or times of the upcoming trip. The trip plan is created or modified to avoid a decrease in total power output from the vehicle group within the one or more geographic areas. The method also includes controlling operation of the vehicle group to move through the geographic area(s) according to the operational setting(s) of the trip plan that is created or modified. This can include, for example, changing speeds, throttle settings, brake effort, brake settings, and/or power sources for powering motor(s).

Another example of a vehicle control system can include one or more processors that may identify a geographic area in which an ambient condition requires deration of a first engine in a multi-vehicle system to avoid damaging the engine. The one or more processors can control one or more of (a) a second engine in the multi-vehicle system to supplant a reduction in power output by the first engine during travel through the geographic area or (b) an onboard energy storage device to power a motor and supplant the reduction in power output by the first engine during travel through the geographic area. The one or more processors can identify the geographic area due to an oxygen level in the geographic area being less than a threshold oxygen level.

As used herein, the terms “processor” and “computer,” and related terms, e.g., “processing device,” “computing device,” and “controller” may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term “non-transitory computer-readable media” represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:

receiving vehicle makeup information from multiple vehicles in a multi-vehicle system, the vehicle makeup information representing one or more characteristics of the vehicles, the vehicle makeup information received at a controlling vehicle of the vehicles in the multi-vehicle system that controls movement of the multi-vehicle system;

receiving, at the controlling vehicle, locations from location-determining devices respectively onboard the vehicles in the multi-vehicle system;

determining a sequence of the vehicles in the multi-vehicle system using the locations of the vehicles that are received at the controlling vehicle; and controlling, with the controlling vehicle, operation of the multi-vehicle system using a combination of the vehicle makeup information received from the vehicles, the locations of the vehicles, and the sequence of vehicles.

2. The method of claim 1, further comprising:

determining a shape of a path over which the multi-vehicle system extends using the locations of the vehicles that are received;

comparing the shape of the path over which the multi-vehicle system extends with a shape of a route that is stored in a route database; and one or more of verifying or modifying the shape of the route that is stored in the route database based on comparing the shape of the path with the shape of the route.

3. The method of claim 1, wherein the vehicles include individually addressable brake control devices configured to be controlled by the controlling vehicle, wherein controlling the operation of the multi-vehicle system includes controlling one or more of the brake control devices based on the locations of the vehicles that are received.

4. The method of claim 3, further comprising:

determining a state of a first brake in the multi-vehicle system, wherein at least a second brake in the multi-vehicle system is controlled based on the state of the first brake and based on the location of at least the second brake.

5. The method of claim 4, wherein the first brake and the second brake are disposed onboard different vehicles of the vehicles in the multi-vehicle system.

6. The method of claim 4, wherein the first brake is disposed onboard a first vehicle of the vehicles in the multi-vehicle system and the state that is determined indicates that the first brake has failed, and further comprising:

determining that the second brake is disposed onboard a second vehicle of the vehicles in the multi-vehicle system that is within a threshold distance from the first vehicle; and changing engagement of the second brake based on the state of the first brake and the second vehicle being within the threshold distance from the first vehicle.

7. The method of claim 1, further comprising:

receiving a signal at the controlling vehicle from a first vehicle in the multi-vehicle system or a second vehicle that is not in the multi-vehicle system; and determining whether the location of the first vehicle or the second vehicle that sent the signal is located on a first route segment that the controlling vehicle also is located, wherein the operation of the multi-vehicle system is controlled based on the signal that is received responsive to determining that the signal is received from the first vehicle that is in the multi-vehicle system and that the signal is not received from the second vehicle that is not in the multi-vehicle system.

8. The method of claim 1, further comprising:

receiving a signal at the controlling vehicle from a first vehicle in the multi-vehicle system or a second vehicle that is not in the multi-vehicle system; and determining whether the location of the first vehicle or the second vehicle that sent the signal is located on a first route segment that the controlling vehicle also is located, wherein the operation of the multi-vehicle system is not controlled based on the signal that is received responsive to determining that the signal is received from the second vehicle that is not in the multi-vehicle system and that the signal is not received from the first vehicle that is in the multi-vehicle system.

9. A control system comprising:

a controller configured to be disposed onboard a controlling vehicle of a multi-vehicle system, the controller configured to receive vehicle makeup information from multiple other vehicles in the multi-vehicle system, the vehicle makeup information representing one or more characteristics of the other vehicles, the controller also configured to receive locations from location-determining devices respectively onboard the other vehicles in the multi-vehicle system, to determine a sequence of the vehicles in the multi-vehicle system using the locations of the vehicles that are received at the controlling vehicle, and to control operation of the multi-vehicle system using a combination of the vehicle makeup information received from the other vehicles the locations of the other vehicles, and the sequence of the vehicles.

10. The control system of claim 9, wherein the controller is configured to determine a shape of a path over which the multi-vehicle system extends using the locations of the other vehicles that are received, compare the shape of the path over which the multi-vehicle system extends with a shape of a route that is stored in a route database, and one or more of verify or modify the shape of the route that is stored in the route database based on comparing the shape of the path with the shape of the route.

11. The control system of claim 9, wherein the other vehicles include individually addressable brakes configured to be controlled by the controlling vehicle, and wherein the controller is configured to control the operation of the multi-vehicle system by controlling one or more of the brakes based on the locations of the other vehicles that are received.

12. The control system of claim 11, wherein the controller is configured to determine a state of a first brake of the brakes in the multi-vehicle system, the controller also configured to control at least a second brake of the brakes in the multi-vehicle system based on the location of the first brake and based on the location of at least the second brake.

13. The control system of claim 12, wherein the first brake is disposed onboard a first vehicle of the other vehicles in the multi-vehicle system and the state that is determined indicates that the first brake has failed.

14. The control system of claim 13, wherein the controller is configured to determine that the second brake is disposed onboard a second vehicle of the other vehicles in the multi-vehicle system that is within a threshold distance from the first vehicle and to change engagement of the second brake based on the state of the first brake and the second vehicle being within the threshold distance from the first vehicle.

15. The control system of claim 9, wherein the controller is configured to receive a signal at the controlling vehicle from a first vehicle in the multi-vehicle system or a second vehicle that is not in the multi-vehicle system and determine whether the location of the first vehicle or the second vehicle that sent the signal is located on a first route segment that the controlling vehicle also is located, the controller configured to control the operation of the multi-vehicle system based on the signal that is received responsive to determining that the signal is received from the first vehicle that is in the multi-vehicle system and that the signal is not received from the second vehicle that is not in the multi-vehicle system.

16. The method of claim 1, wherein receiving, at the controlling vehicle, the locations from location-determining devices respectively onboard the vehicles in the multi-vehicle system comprises receiving different location signals from different non-propulsion vehicles of the multi-vehicle system at a propulsion vehicle of the multi-vehicle system, the location signals indicating different locations of the non-propulsion vehicles, the method further comprising:

determining a sequence of the non-propulsion vehicles in the multi-vehicle system based on the locations that are received; and controlling brakes onboard the non-propulsion vehicles based on the sequence of the non-propulsion vehicles.

17. The method of claim 16, wherein controlling the brakes includes individually engaging a first brake of the brakes responsive to at least a second brake of the brakes failing, wherein the first brake is engaged based on the location of the non-propulsion vehicle that includes the first brake.

18. The method of claim 16, wherein controlling the brakes includes disregarding a signal received by a controller onboard the propulsion vehicle from a second non-propulsion vehicle that is not included in the multi-vehicle system based on a second location signal received from the second non-propulsion vehicle.

* * * * *